US012772263B2

(12) United States Patent
Huang et al.

(10) Patent No.: US 12,772,263 B2
(45) Date of Patent: Oct. 20, 2026

(54) DATA TRANSFER FOR INTEGRATED ACCESS AND BACKHAUL SYSTEM USING FULL-DUPLEX

(71) Applicant: QUALCOMM Incorporated, San Diego, CA (US)

(72) Inventors: Min Huang, Beijing (CN); Chao Wei, Beijing (CN); Qiaoyu Li, Beijing (CN)

(73) Assignee: QUALCOMM Incorproated, San Diego, CA (US)

( * ) Notice: Subject to any disclaimer, the term of this patent is extended or adjusted under 35 U.S.C. 154(b) by 586 days.

(21) Appl. No.: 17/597,453

(22) PCT Filed: Jul. 9, 2019

(86) PCT No.: PCT/CN2019/095210

§ 371 (c)(1),
(2) Date: Jan. 6, 2022

(87) PCT Pub. No.: WO2021/003660

PCT Pub. Date: Jan. 14, 2021

(65) Prior Publication Data

US 2022/0256533 A1 Aug. 11, 2022

(51) Int. Cl.
*H04W 72/27* (2023.01)
*H04L 5/14* (2006.01)
(Continued)

(52) U.S. Cl.
CPC ............... *H04W 72/27* (2023.01); *H04L 5/14* (2013.01); *H04W 72/0446* (2013.01);
(Continued)

(58) Field of Classification Search
CPC ............. H04W 72/0453; H04W 72/27; H04W 72/541; H04W 72/0446; H04W 88/14; H04L 5/14
See application file for complete search history.

(56) References Cited

U.S. PATENT DOCUMENTS 10,278,088 B2 4/2019 Vitthaladevuni et al.
2016/0006498 A1* 1/2016 Chung ............... H04B 7/15542 370/315

(Continued)

FOREIGN PATENT DOCUMENTS

CN 108934030 A 12/2018
CN 109478981 A 3/2019

(Continued)

OTHER PUBLICATIONS

C. D. Nwankwo et al.: Survey of Self-Interference Management Techniques for Single Frequency FD Systems, IEEE Access, vol. 6, 2018 (Year: 2018).*

(Continued)

*Primary Examiner* — Intekhaab A Siddiquee
(74) *Attorney, Agent, or Firm* — Harrity & Harrity, LLP

(57) ABSTRACT

Various aspects of the present disclosure generally relate to wireless communication. In some aspects, an integrated access and backhaul (IAB) node may transmit, to a parent node of the IAB node, full-duplex (FD) information based at least in part on a transmit power value for an FD mode. The IAB node may receive an FD resource allocation for the IAB node, wherein the FD resource allocation identifies a resource to be used for a first communication link with the parent node and a second communication link in the FD mode, and wherein the FD resource allocation is based at least in part on the FD information. The IAB node may communicate on the first communication link and the second communication link in accordance with the FD resource allocation. Numerous other aspects are provided.

30 Claims, 12 Drawing Sheets

(51) Int. Cl.

| | |
|---|---|
| ***H04W 72/0446*** | (2023.01) |
| ***H04W 72/0453*** | (2023.01) |
| ***H04W 72/541*** | (2023.01) |
| ***H04W 88/14*** | (2009.01) |

(52) U.S. Cl.

CPC ..... *H04W 72/0453* (2013.01); *H04W 72/541* (2023.01); *H04W 88/14* (2013.01)

(56) References Cited

U.S. PATENT DOCUMENTS

| | | | | |
|---|---|---|---|---|
| 2016/0198475 | A1* | 7/2016 | Uchiyama | H04W 52/46 370/329 |
| 2016/0249302 | A1* | 8/2016 | Uchiyama | H04W 52/243 |
| 2018/0049190 | A1 | 2/2018 | Abedini et al. | |
| 2019/0021084 | A1 | 1/2019 | Stirling-Gallacher et al. | |

FOREIGN PATENT DOCUMENTS

| | | | |
|---|---|---|---|
| CN | 109478988 | A | 3/2019 |
| CN | 109964419 | A | 7/2019 |
| WO | 2017111905 | A1 | 6/2017 |
| WO | 2018018015 | A1 | 1/2018 |
| WO | WO-2019074761 | A1 | 4/2019 |

OTHER PUBLICATIONS

International Search Report and Written Opinion—PCT/CN2019/095210—ISA/EPO—Mar. 26, 2020.

Nokia, et al., "Dynamic Resource Allocation Between Backhaul and Access Links", 3GPP TSG RAN WG1 Meeting #92bis, R1-1804622, Apr. 20, 2018 (Apr. 20, 2018), 7 Pages, Section 2.

Nokia, et al., "Resource Allocation and Coordination for IAB", 3GPP TSG RAN WG2 Meeting #104, 3GPP Draft, R2-1817617_IAB_Resource Allocation_V3, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 1, 2018, XP051481516, 7 pages, Retrieved from the Internet: URL:http://www.3gpp.org/ftp/tsg%5Fran/WG2%5FRL2/TSGR2%5F104/Docs/R2%2D1817617%2Ezip, http://www.3gpp.org/ftp/tsg%5Fran/WG2%5FRL2/TSGR2%5F104/Docs/R2%2D1817617%2Ezip [retrieved on Nov. 1, 2018], the Whole Document.

Vivo: "Discussion on IAB Node Access and Resource Allocation", 3GPP TSG-RAN WG2 NR AHI807 Meeting, R2-1809864, Jul. 6, 2018 (Jun. 7, 2018), 3 Pages, the whole document.

ZTE, et al., "Discussion on Physical Layer Enhancements for NR IAB", 3GPP TSG RAN WG1 Meeting #95, R1-1812729, Nov. 16, 2018 (Nov. 16, 2018), pp. 1-9, Section 5.

Nokia., et al., Mechanisms for Resource Multiplexing Among Backhaul and Access Links, 3GPP TSG RAN WG1 Meeting #97, R1-1907116_IAB Resource Allocation, 3rd Generation Partnership Project, Mobile Competence Centre, 650, Route Des Lucioles, F-06921 Sophia-Antipolis Cedex, France, vol. RAN WG1, No. Reno, NV, USA, May 13-17, 2019, May 13, 2019, XP051728562, 16 Pages.section "4 Inter-IAB rules", incl. sub-section "4.1" and sub-section "4.2", section 5, section "7, section 8, Conclusions", incl. Proposals 6-10.

Nokia, et al., "Resource Allocation/Coordination Between Parent BH and Child links", 3GPP TSG RAN WG1 Meeting #95, R1-1812702, 3rd Generation Partnership Project, Mobile Competence Centre, 650, Route Des Lucioles, F-06921, Sophia-Antipolis Cedex, France, Nov. 12, 2018-Nov. 16, 2018, Nov. 11, 2018, XP051554661, 11 Pages, pp. 2-4. 2.2, Figure 2, IAB resource types p. 5. 2.3 Resource pool coordination, section "2.2, Resources Types 6-9, section" 2.3, Resource pool coordination, Figure 2, section "5 Conclusions", incl. Proposals 6-8, Observations 1-5.

Supplementary European Search Report—EP19936717—Search Authority—The Hague—Mar. 15, 2023.

Qualcomm Incorporated: "Status Report to TSG", 3GPP TSG RAN meeting #82, RP-182321, Sorrento, Italy, Dec. 10-13, 2018, pp. 1-28.

* cited by examiner

DATA TRANSFER FOR INTEGRATED ACCESS AND BACKHAUL SYSTEM USING FULL-DUPLEX

CROSS-REFERENCE TO RELATED APPLICATION

This application is a 371 national stage of Patent Cooperation Treaty (PCT) Application No. PCT/CN2019/095210 filed on Jul. 9, 2019, entitled "DATA TRANSFER FOR INTEGRATED ACCESS AND BACKHAUL SYSTEM USING FULL-DUPLEX," which is hereby expressly incorporated by reference herein.

FIELD OF THE DISCLOSURE

Aspects of the present disclosure generally relate to wireless communication and to techniques and apparatuses for a data transfer for integrated access and backhaul (IAB) system using full-duplex (FD).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by an integrated access and backhaul (IAB) node, may include transmitting, to a parent node of the IAB node, full-duplex (FD) information based at least in part on a transmit power value for an FD mode; receiving an FD resource allocation for the TAB node, wherein the FD resource allocation identifies a resource to be used for a first communication link with the parent node and a second communication link in the FD mode, and wherein the FD resource allocation is based at least in part on the FD information; and communicating on the first communication link and the second communication link in accordance with the FD resource allocation.

In some aspects, a method of wireless communication, performed by an TAB node, may include receiving, from a child node of the TAB node, FD information based at least in part on a transmit power value for an FD mode; determining an FD resource allocation for the child node, wherein the FD resource allocation identifies a resource to be used for a first communication link with the child node and a second communication link in the FD mode, and wherein the FD resource allocation is based at least in part on the FD information; and transmitting information identifying the FD resource allocation to the child node.

In some aspects, an TAB node for wireless communication may include a memory; and one or more processors operatively coupled to the memory, the memory and the one or more processors configured to: transmit, to a parent node of the TAB node, FD information based at least in part on a transmit power value for an FD mode; receive an FD resource allocation for the TAB node, wherein the FD resource allocation identifies a resource to be used for a first communication link with the parent node and a second communication link in the FD mode, and wherein the FD resource allocation is based at least in part on the FD information; and communicate on the first communication link and the second communication link in accordance with the FD resource allocation.

In some aspects, an TAB node for wireless communication may include a memory; and one or more processors operatively coupled to the memory, the memory and the one or more processors configured to: receive, from a child node of the TAB node, FD information based at least in part on a transmit power value for an FD mode; determine an FD resource allocation for the child node, wherein the FD resource allocation identifies a resource to be used for a first communication link with the child node and a second communication link in the FD mode, and wherein the FD resource allocation is based at least in part on the FD information; and transmit information identifying the FD resource allocation to the child node.

In some aspects, a non-transitory computer-readable medium may store one or more instructions for wireless communication. The one or more instructions, when executed by one or more processors of an TAB node, may cause the one or more processors to: transmit, to a parent node of the TAB node, FD information based at least in part on a transmit power value for an FD mode; receive an FD resource allocation for the TAB node, wherein the FD resource allocation identifies a resource to be used for a first communication link with the parent node and a second communication link in the FD mode, and wherein the FD resource allocation is based at least in part on the FD information; and communicate on the first communication link and the second communication link in accordance with the FD resource allocation.

In some aspects, a non-transitory computer-readable medium may store one or more instructions for wireless communication. The one or more instructions, when executed by one or more processors of an TAB node, may cause the one or more processors to: receive, from a child node of the TAB node, full-duplex (FD) information based at least in part on a transmit power value for an FD mode; determine an FD resource allocation for the child node, wherein the FD resource allocation identifies a resource to be used for a first communication link with the child node and a second communication link in the FD mode, and wherein the FD resource allocation is based at least in part on the FD information; and transmit information identifying the FD resource allocation to the child node.

In some aspects, an apparatus for wireless communication may include means for transmitting, to a parent node of the apparatus, FD information based at least in part on a transmit power value for an FD mode; means for receiving an FD resource allocation for the apparatus, wherein the FD resource allocation identifies a resource to be used for a first communication link with the parent node and a second communication link in the FD mode, and wherein the FD resource allocation is based at least in part on the FD information; and means for communicating on the first communication link and the second communication link in accordance with the FD resource allocation.

In some aspects, an apparatus for wireless communication may include means for receiving, from a child node of the apparatus, FD information based at least in part on a transmit power value for an FD mode; means for determining an FD resource allocation for the child node, wherein the FD resource allocation identifies a resource to be used for a first communication link with the child node and a second communication link in the FD mode, and wherein the FD resource allocation is based at least in part on the FD information; and means for transmitting information identifying the FD resource allocation to the child node.

Aspects generally include a method, apparatus, system, computer program product, non-transitory computer-readable medium, user equipment, base station, wireless communication device, IAB node, and/or processing system as substantially described with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
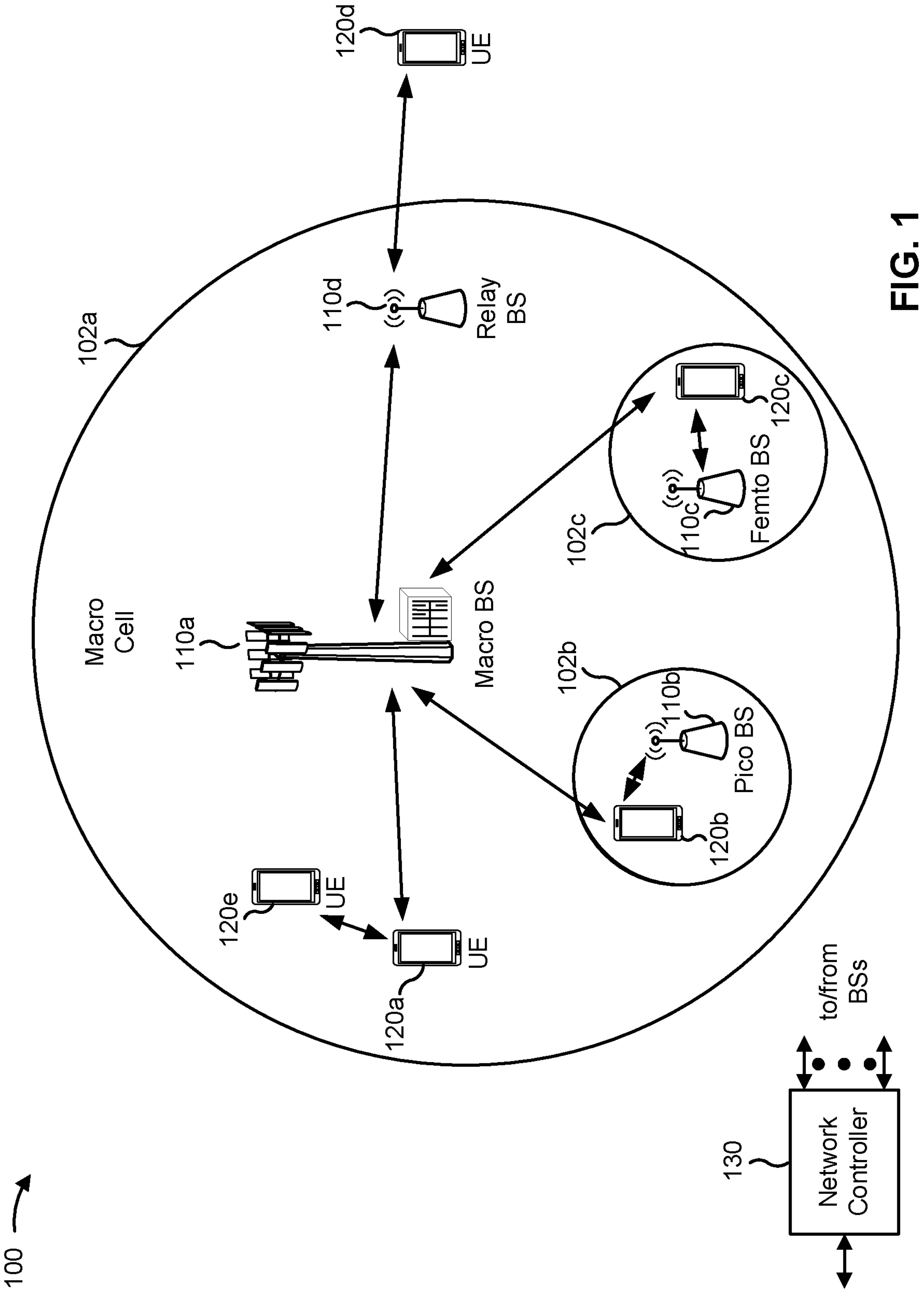
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
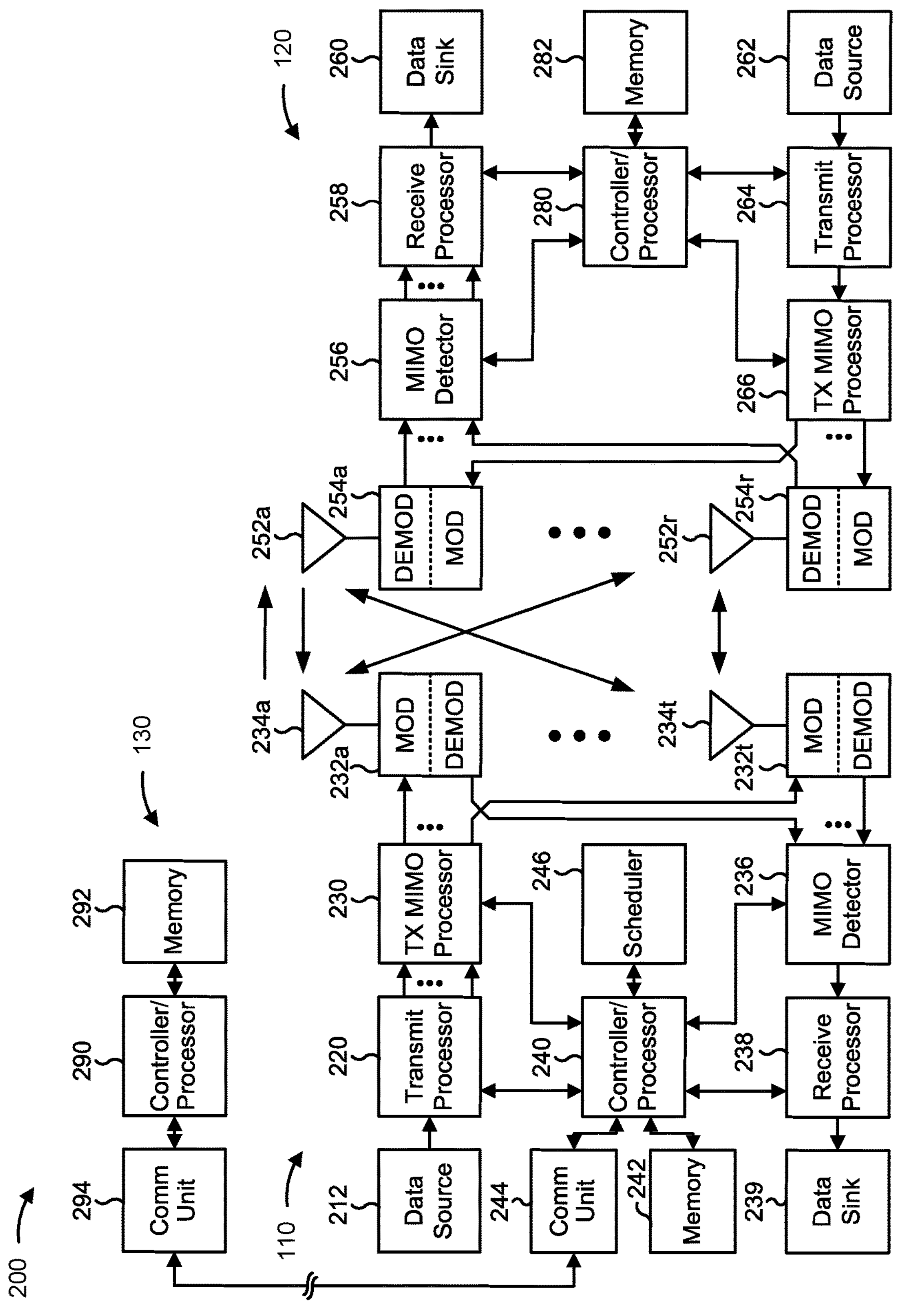
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with data transfer for an IAB system using full-duplex, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 1100 of FIG. 11, process 1200 of FIG. 12, and/or other processes as described herein. A scheduler 246 may schedule UEs for data transmission on the downlink and/or uplink.

In some aspects, UE 120 may include means for transmitting, to a parent node of the IAB node, full-duplex (FD) information based at least in part on a transmit power value for an FD mode; means for receiving an FD resource allocation for the IAB node, wherein the FD resource allocation identifies a resource to be used for a first communication link with the parent node and a second communication link in the FD mode, and wherein the FD resource allocation is based at least in part on the FD information; means for communicating on the first communication link and the second communication link in accordance with the FD resource allocation; means for transmitting non-FD information to the parent node; means for receiving a non-FD resource allocation from the parent node, wherein the non-FD resource allocation is based at least in part on the non-FD information; means for communicating on the first communication link and the second communication link using the non-FD resource allocation and the FD resource allocation; means for communicating on multiple second communication links with multiple receivers or transmitters in accordance with the FD resource allocation; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a child node of the IAB node, FD information based at least in part on a transmit power value for an FD mode; means for determining an FD resource allocation for the child node, wherein the FD resource allocation identifies a resource to be used for a first communication link with the child node and a second communication link in the FD mode, and wherein the FD resource allocation is based at least in part on the FD information; means for transmitting information identifying the FD resource allocation to the child node; means for determining the FD resource allocation using the reference signal and the transmit power reduction value; means for receiving non-FD information from the child node; means for transmitting a non-FD resource allocation to the child node, wherein the non-FD resource allocation is based at least in part on the non-FD information; means for determining the non-FD resource allocation using a reference signal transmitted by the child node; means for determining the FD resource allocation using the reference signal and the transmit power value; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In a half-duplex IAB system, transmission and reception cannot be performed concurrently for an IAB node. This may constrain concurrent communication across certain types of communication links, as described in more detail below. When transmission and reception traffic are static or change slowly, the pattern for non-concurrent transmission and reception time slots can be determined according to the proportion of transmission traffic and reception traffic. However, when transmission and reception traffic are dynamic or change rapidly, such as when urgent traffic occurs in an inverse-direction time slot, such a non-concurrent transmission-reception pattern may fail to satisfy traffic requirements, such as latency requirements, reliability requirements, throughput requirements, and/or the like.

Some techniques and apparatuses described herein use full-duplex (FD) technology to provide concurrent transmission and reception at an IAB node. This enables dynamic traffic allocation, thereby providing improved system capacity and the capability to quickly deliver traffic in any direction (UL or DL) as the traffic changes direction.

Furthermore, it is challenging to decide the optimal transport format and transmit power in an IAB node chain where FD communication is activated at each IAB node, because the DL/UL metrics along the chain are coupled. Techniques and apparatuses described herein provide an efficient technique for the parent node of an IAB node chain to determine resource allocations, modulation and coding schemes, and/or the like for backhaul links toward a parent node based at least in part on an IAB node's feedback information regarding FD communication of the JAB node. Thus, FD performance is improved. Furthermore, techniques and apparatuses described herein provide self-interference control techniques by using transmit power values (e.g., transmit power reduction values or transmit power restriction values) to determine the resource allocations and/or configurations described above.

Figure 3:
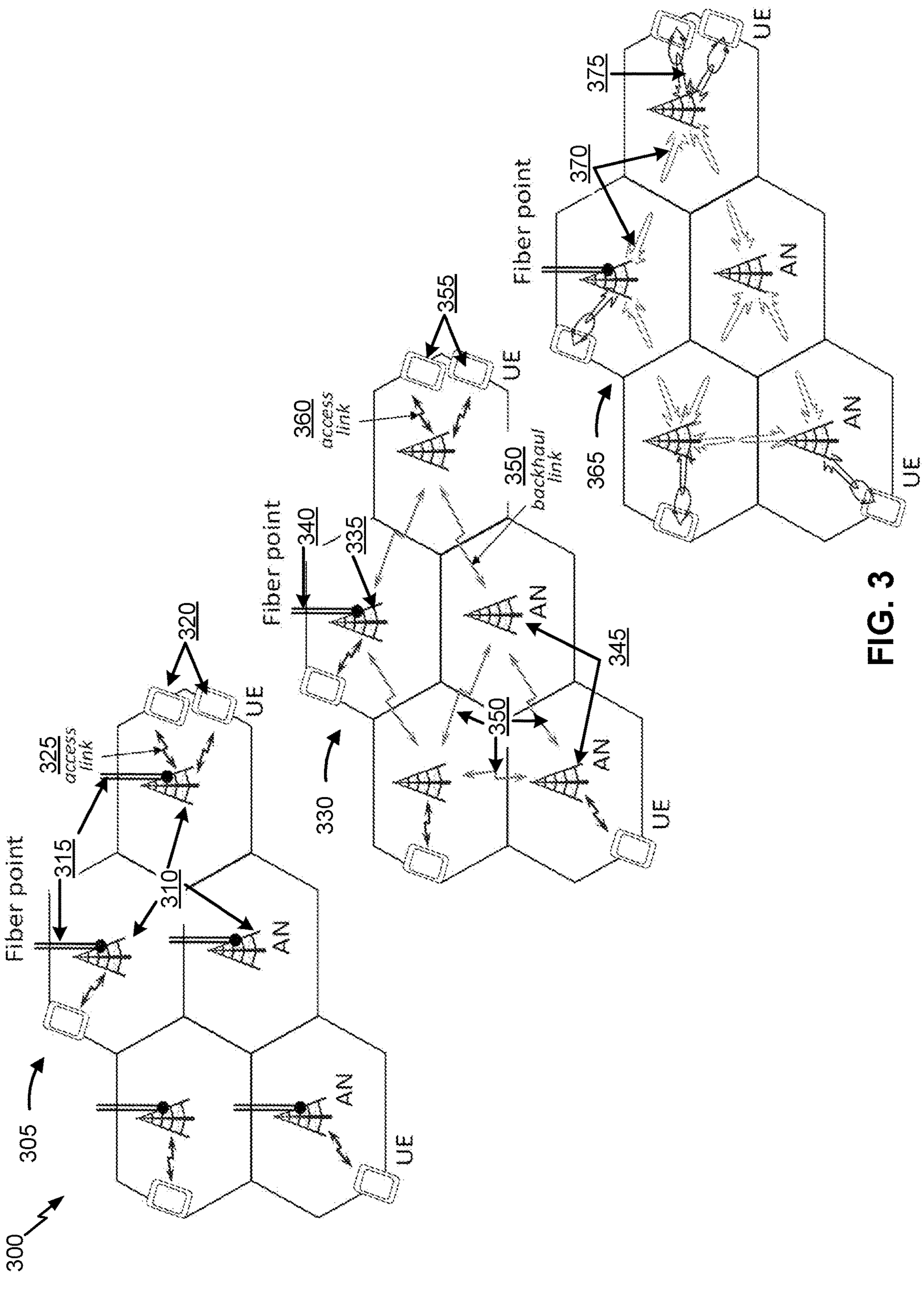
FIG. 3 is a diagram illustrating examples of radio access networks (RANs), in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (JAB) network. In an JAB network, at least one base station is an anchor base station 335 that communicates with a core network via a wired backhaul link 340, such as a fiber connection. An anchor base station 335 may also be referred to as an JAB donor (or JAB-donor). The JAB network may include one or more non-anchor base stations 345, sometimes referred to as relay base stations or JAB nodes (or IAB-nodes). The non-anchor base station 345 may communicate directly or indirectly (e.g., via one or more non-anchor base stations 345) with the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

Some techniques and apparatuses described herein provide FD communication among the nodes and/or UEs of the network shown in FIG. 3.

As indicated above, FIG. 3 is provided as an example. Other examples may differ from what is described with regard to FIG. 3.

Figure 4:
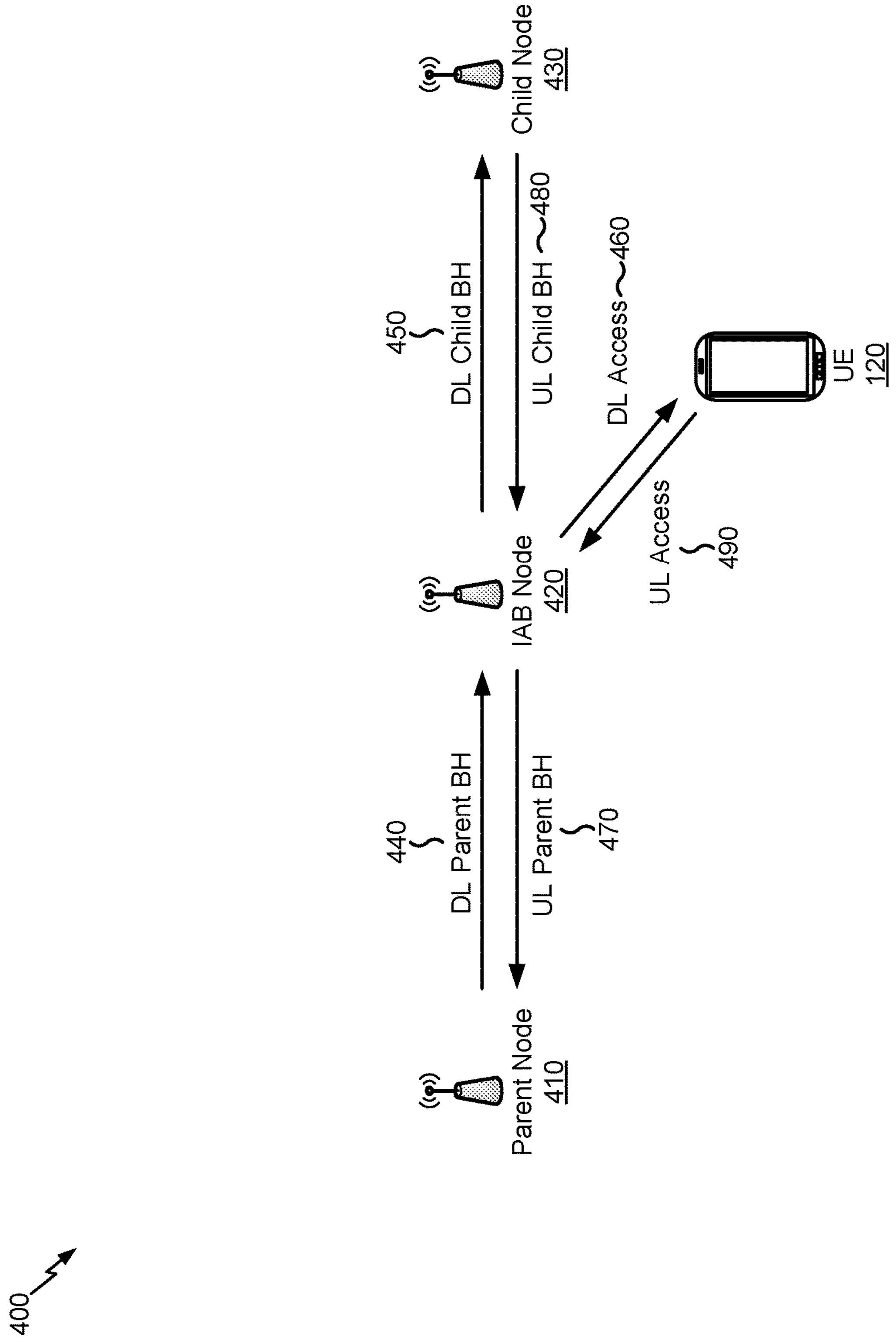
FIG. 4 is a diagram illustrating an example of communication links between IAB nodes and/or UEs of a network.

FIG. 4 is a diagram illustrating an example 400 of communication links between IAB nodes and/or UEs of a network. As shown, example 400 includes a parent node 410, an IAB node 420, a child node 430, and a UE 120. Parent node 410, IAB node 420, and child node 430 may each be an IAB node (e.g., a BS 110, a relay BS 110, a wireless node, and/or the like). In some aspects, parent node 410 may be an IAB donor. Parent node 410 is a parent node of IAB node 420, and child node 430 is a child node of IAB node 420. Child node 430 may be referred to as a grandchild node of parent node 410, and parent node 410 may be referred to as a grandparent node of child node 430.

The nodes 410, 420, 430, and the UE 120, are associated with communication links between each other. Downlink (DL) communication links are shown by reference numbers 440, 450, and 460. DL parent backhaul (BH) link 440 provides a DL backhaul (i.e., backhaul link) from parent node 410 to IAB node 420. DL child BH link 450 provides a DL backhaul from IAB node 420 to child node 430. DL access link 460 provides a DL access link from IAB node 420 to UE 120. Uplink (UL) communication links are shown by reference numbers 470, 480, and 490. UL parent backhaul (BH) link 470 provides a UL backhaul to parent node 410 from IAB node 420. UL child BH link 480 provides a UL backhaul to IAB node 420 from child node 430. UL access link 490 provides a UL access link to IAB node 420 from UE 120.

Some techniques and apparatuses described herein provide configuration of FD communications on the communication links 440 through 490, such as by IAB node 420 via links 440 and 450, by IAB node 420 via links 470 and 480, by IAB node 420 via links 470 and 490, by IAB node 420 via links 440 and 460, or via other combinations of links.

As indicated above, FIG. 4 is provided as an example. Other examples may differ from what is described with regard to FIG. 4.

Figure 5:
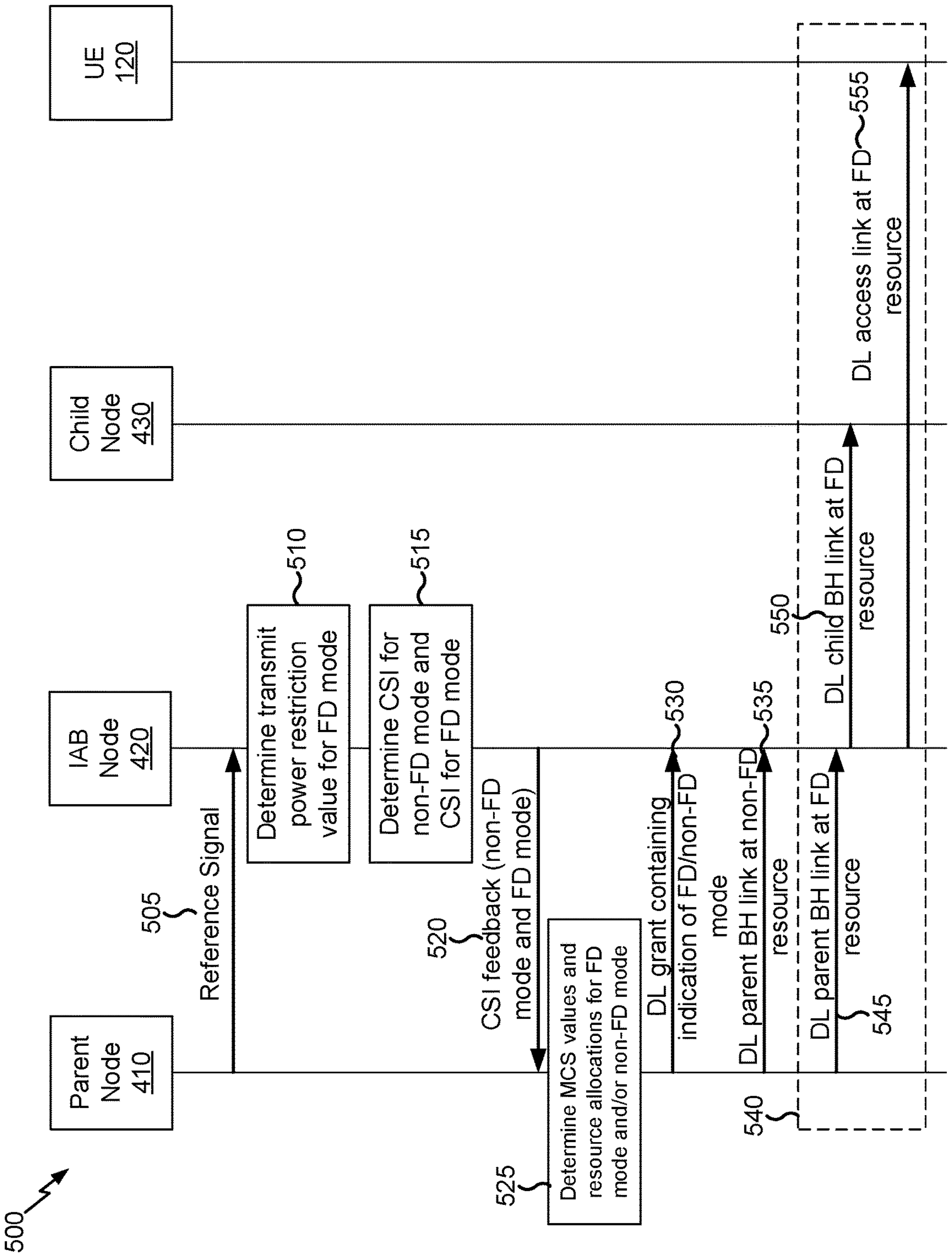
FIG. 5 is a call flow diagram illustrating an example of configuration of downlink FD-mode communication between IAB nodes and/or UEs of a network.

FIG. 5 is a call flow diagram illustrating an example 500 of configuration of downlink FD-mode communication between IAB nodes and/or UEs of a network. For a description of uplink FD-mode communication, refer to the description accompanying FIG. 6. As shown, example 500 includes a parent node 410, an IAB node 420, a child node 430, and a UE 120.

As shown by reference number 505, the parent node 410 may transmit a reference signal 505 to the IAB node 420. In some aspects, the reference signal (RS) may include a channel state information (CSI) reference signal (CSI-RS) and/or the like. In some aspects, the parent node 410 may transmit multiple CSI-RSs to the IAB node 420 (e.g., corresponding to different resources for which the IAB node 420 is to determine feedback). In some aspects, the parent node 410 may provide a CSI report configuration to the IAB node 420. The CSI report configuration may indicate a location of the CSI-RS, a format of the CSI report, a periodicity or trigger condition associated with the CSI report, and/or the like.

As shown by reference number 510, the IAB node 420 may determine a transmit power value (shown here as a transmit power restriction value) for the FD mode. Furthermore, as shown by reference number 515, the IAB node 420 may determine CSI for the non-FD mode and/or CSI for the FD mode. The transmit power restriction value may identify a maximum transmit power (sometimes expressed as P_tx_max) for an FD communication based at least in part on a self-interference condition at the IAB node 420.

To determine the transmit power restriction value and the CSI, the IAB node 420 may determine a transmit power in a DL child BH to child node 430 or a DL access link to UE 120. In some cases, the transmit power may be a static or fixed value. In some cases, the transmit power may be based at least in part on pathloss in the DL child BH link or the DL access link. The IAB node 420 may determine a self-interference strength from the transmitted signal on the DL child BH link or the DL access link to the DL parent BH link, based at least in part on the transmit power in the DL child BH link or the DL access link and a self-interference cancellation ratio of the IAB node 420. For example, the self-interference strength may be equal to the transmit power in the DL child BH link or the DL access link subtracting the self-interference cancellation ratio. The IAB node 420 may determine CSI for the FD mode based at least in part on the self-interference strength and a channel status estimation using the CSI-RS received on the DL parent BH link. For example, if the self-interference strength is larger than interference-plus-noise power for the non-FD mode, the CSI derived from the CSI-RS for the non-FD mode may be degraded in accordance with the self-interference strength for the FD mode, to determine the CSI for the FD mode. Since this CSI for FD mode is based at least in part on the determined transmit power in a DL child BH to child node 430 or a DL access link to UE 120, when executing the data transfer in DL parent link based at least in part on the report of this CSI, the actual transmit power in a DL child BH or a DL access link may not exceed the determined transmit power, and thus the determined transmit power is referred to as the transmit power restriction value.

As shown by reference number 520, the IAB node 420 may provide CSI feedback to the parent node 410. For example, the IAB node 420 may provide a CSI report indicating CSI values for the FD mode and/or for the non-FD mode.

As shown by reference number 525, the parent node 410 may determine modulation and coding scheme (MCS) values and resource allocations for at least one of the FD mode and/or the non-FD mode. The MCS values and the resource allocations may be for the DL parent BH link. In some aspects, the parent node 410 may determine a first MCS value for the FD mode and a second MCS value for the non-FD mode. The first MCS value may be more conservative than the second MCS value (e.g., more robust, higher reliability, lower throughput, and/or the like) due to the increased self-interference in the FD zone relative to the non-FD zone. A more detailed description of the resource allocations for the FD mode and the non-FD mode in the DL is provided in connection with FIGS. 7-10.

As shown by reference number 530, the parent node 410 may provide a downlink grant to the JAB node 420. As further shown, the downlink grant may include an indication of whether the downlink grant is associated with the FD mode or the non-FD mode. The downlink grant may include information identifying the MCS value for the FD mode, the MCS value for the non-FD mode, the resource allocation for the FD mode, and/or the resource allocation for the non-FD mode.

A communication using the non-FD mode is shown by reference number 535. For example, this communication may use the non-FD mode resource allocation and the non-FD mode MCS. This communication may occur contemporaneously with the FD mode communications shown by reference number 540 (e.g., using different frequency resources) or may occur on a same frequency resource as the FD mode communications shown by reference number 540 (e.g., using different time resources). Communications using the FD mode are shown within the dashed box indicated by reference number 540. The JAB node 420 may schedule these communications in accordance with the transmit power restriction value for the FD mode and based at least in part on the resource allocations provided by the parent node 410. As shown by reference number 545, a DL parent BH link (sometimes referred to as a first communication link) between the parent node 410 and the JAB node 420 may use an FD resource. The FD resource may also be used for at least one of a DL child BH link (shown by reference number 550) or a DL access link (shown by reference number 555). In some aspects, one or more of the communication links shown by reference numbers 550 and 555 may be referred to as second communication links.

Thus, the parent node 410 determines MCS and resource allocations for an FD mode communication and/or a non-FD mode communication in accordance with CSI that is determined using a transmit power restriction value provided by the IAB node 420 for the FD mode and/or the non-FD mode. This may improve throughput, enables the handling of unexpected traffic in either link direction, and improves flexibility of the network.

As indicated above, FIG. 5 is provided as an example. Other examples may differ from what is described with regard to FIG. 5.

Figure 6:
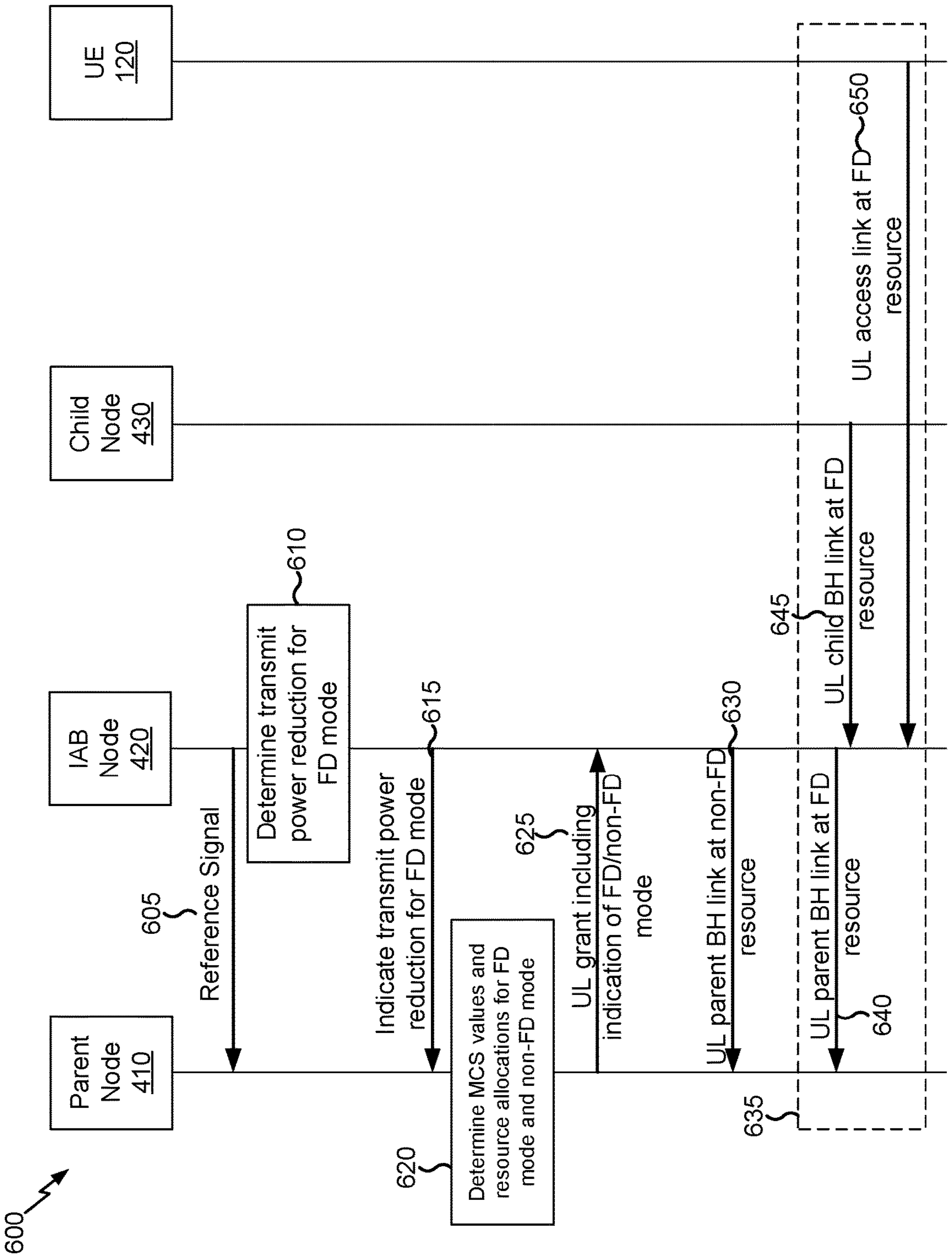
FIG. 6 is a call flow diagram illustrating an example of configuration of uplink FD-mode communication between IAB nodes and/or UEs of a network.

FIG. 6 is a call flow diagram illustrating an example 600 of configuration of uplink FD-mode communication between IAB nodes and/or UEs of a network.

As shown by reference number 605, the IAB node 420 may transmit a reference signal 605 to the parent node 410. In some aspects, the reference signal 605 may include a sounding reference signal (SRS) and/or the like.

As shown by reference number 610, the IAB node 420 may determine a transmit power value (shown here as a transmit power reduction value) for the FD mode. The transmit power reduction value may identify a reduction of a transmit power in the FD mode as an absolute value, or relative to the transmit power in the non-FD mode. To determine the transmit power reduction value, the IAB node 420 may determine an allowable self-interference strength at a receiver of the UL child BH link or the UL access link. In some cases, the allowable self-interference strength may be a static or fixed value. In some aspects, the allowable self-interference strength may be based at least in part on the received signal strength and target signal-to-interference-plus-noise ratio (SINR) on the UL child BH link or the UL access link. The IAB node 420 may determine the transmit power reduction value for the FD mode based at least in part on the allowable self-interference strength and a self-interference cancellation ratio of the IAB node 420. Specifically, the transmit power for the FD mode may be equal to the allowable self-interference strength in the UL child BH link or the UL access link plus the self-interference cancellation ratio, and then the transmit power reduction value is equal to the transmit power for the non-FD mode subtracting the transmit power for the FD mode.

As shown by reference number 615, the IAB node 420 may indicate the transmit power reduction value for the FD mode to the parent node 410. For example, the IAB node 420 may use any suitable messaging format, such as a media access control (MAC) control element (CE) and/or the like. As shown by reference number 620, the parent node 410 may determine modulation and coding scheme (MCS) values and resource allocations for at least one of the FD mode and/or the non-FD mode using the transmit power reduction value provided by the IAB node 420. The MCS values and the resource allocations may be for communications between the parent node 410 and the IAB node 420 on the UL parent BH link. In some aspects, the parent node 410 may determine a first MCS value for the FD mode and a second MCS value for the non-FD mode. The first MCS value may be more conservative than the second MCS value (e.g., more robust, higher reliability, lower throughput, etc.) due to the reduced transmit power in the FD zone relative to the non-FD zone. A more detailed description of the resource allocations for the FD mode and the non-FD mode in the DL is provided in connection with FIGS. 7-10.

In some aspects, the parent node 410 may determine the MCS and resource allocation based at least in part on the SRS. For example, the parent node 410 may determine a channel status estimation using the SRS on the UL parent BH link. The parent node 410 may determine the MCS and the resource allocation for the non-FD mode based at least in part on the channel status estimation. The parent node 410 may determine the MCS and resource allocation for the FD mode based at least in part on the channel status estimation and the received transmit power reduction value. For example, the transmit power at FD mode may be determined to be equal to the transmit power at non-FD mode subtracting the transmit power reduction value. Thus, the parent node 410 may determine a more conservative (e.g., lower, more robust) MCS value for the FD zone on the UL parent BH link based at least in part on the lower transmit power in the FD zone.

As shown by reference number 625, the parent node 410 may provide an uplink grant to the IAB node 420. As further shown, the uplink grant may include an indication of whether the uplink grant is associated with the FD mode or the non-FD mode. The uplink grant may include information identifying the MCS value for the FD mode, the MCS value for the non-FD mode, the resource allocation for the FD mode, and/or the resource allocation for the non-FD mode.

A communication using the non-FD mode is shown by reference number 630. For example, this communication may use the non-FD mode resource allocation and the non-FD mode MCS. This communication may occur contemporaneously with the FD mode communications shown by reference number 635 (e.g., using different frequency resources) or may occur on a same frequency resource as the FD mode communications shown by reference number 635 (e.g., using different time resources).

Communications using the FD mode are shown within the dashed box indicated by reference number 635. As shown by reference number 640, a UL parent BH link (sometimes referred to as a first communication link) between the parent node 410 and the IAB node 420 may use an FD resource.

The IAB node 420 may transmit communications on the UL parent BH link using the transmit power reduction value. The FD resource may also be used for at least one of a UL child BH link (shown by reference number 645) or a UL access link (shown by reference number 650). In some aspects, one or more of the communication links shown by reference numbers 650 and 655 may be referred to as second communication links.

Thus, the parent node 410 determines MCS and resource allocations for an FD mode communication and/or a non-FD mode communication in accordance with SRS and/or a transmit power reduction value provided by the IAB node 420 for the FD mode and/or the non-FD mode. This may improve throughput, enables the handling of unexpected traffic in either link direction, and improves flexibility of the network.

As indicated above, FIG. 6 is provided as an example. Other examples may differ from what is described with regard to FIG. 6.

Figure 7:
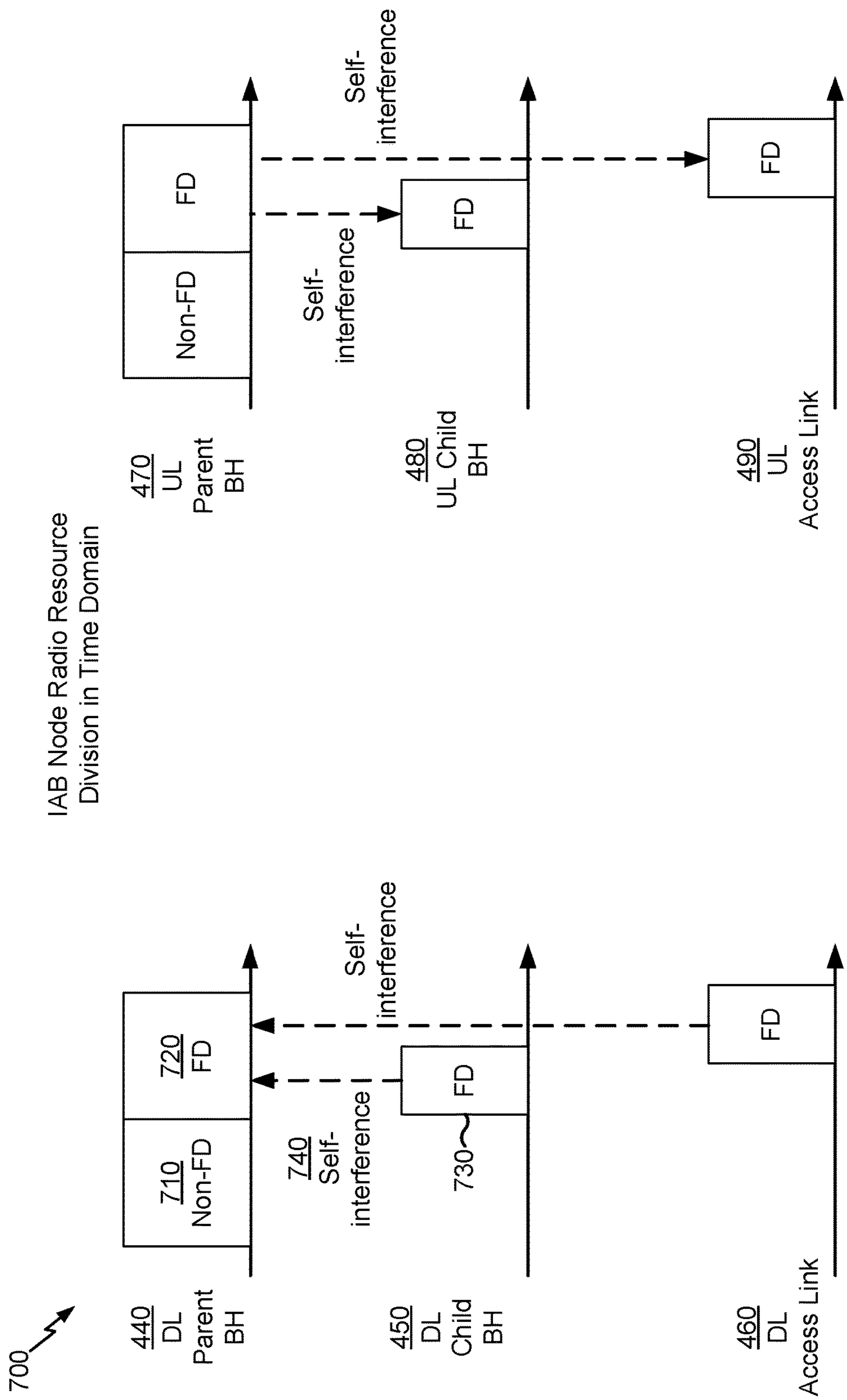
FIG. 7 is a diagram illustrating an example of an IAB node radio resource division in the time domain.

FIG. 7 is a diagram illustrating an example 700 of an IAB node radio resource division in the time domain. Resources on a variety of BH and access links are shown by reference numbers 440 through 490 (referring back to FIG. 4). For example, example 700 shows that the DL parent BH link 440 may carry at least one of a non-FD communication 710 and an FD communication 720, which are separated in time and concurrent in frequency. The non-FD communication 710 and the FD communication 720 may be associated with different interference levels and thus different MCSs. Furthermore, a FD communication 730, on the DL child BH link 450 may self-interfere with the FD communication 720 on the DL parent BH link 440 as shown by reference number 740. This is because the IAB node 420 (not shown in FIG. 7), which transmits the FD communication 730 on the DL child BH link 450 to the child node 430 (not shown in FIG. 7), may self-interfere with reception of the FD communication 720 on the DL parent BH link 440. Similar self-interference may occur due to the IAB node 420's FD communication to the UE 120 on the DL access link 460, which may interfere with the FD communication from the parent node 410 on the DL parent BH 440. Furthermore, it can be seen that similar self interference may occur on the uplink, such as an FD communication on the UL parent BH 470 interfering with the FD communication from the child node 430 on the UL child BH 480 and the FD communication on the UL parent BH 470 interfering with the FD communication from the UE 120 on the UL access link 490. On the uplink, different transmit powers in the FD mode and the non-FD mode may cause different MCS values for the non-FD communication and the FD communication.

As indicated above, FIG. 7 is provided as an example. Other examples may differ from what is described with regard to FIG. 7.

Figure 8:
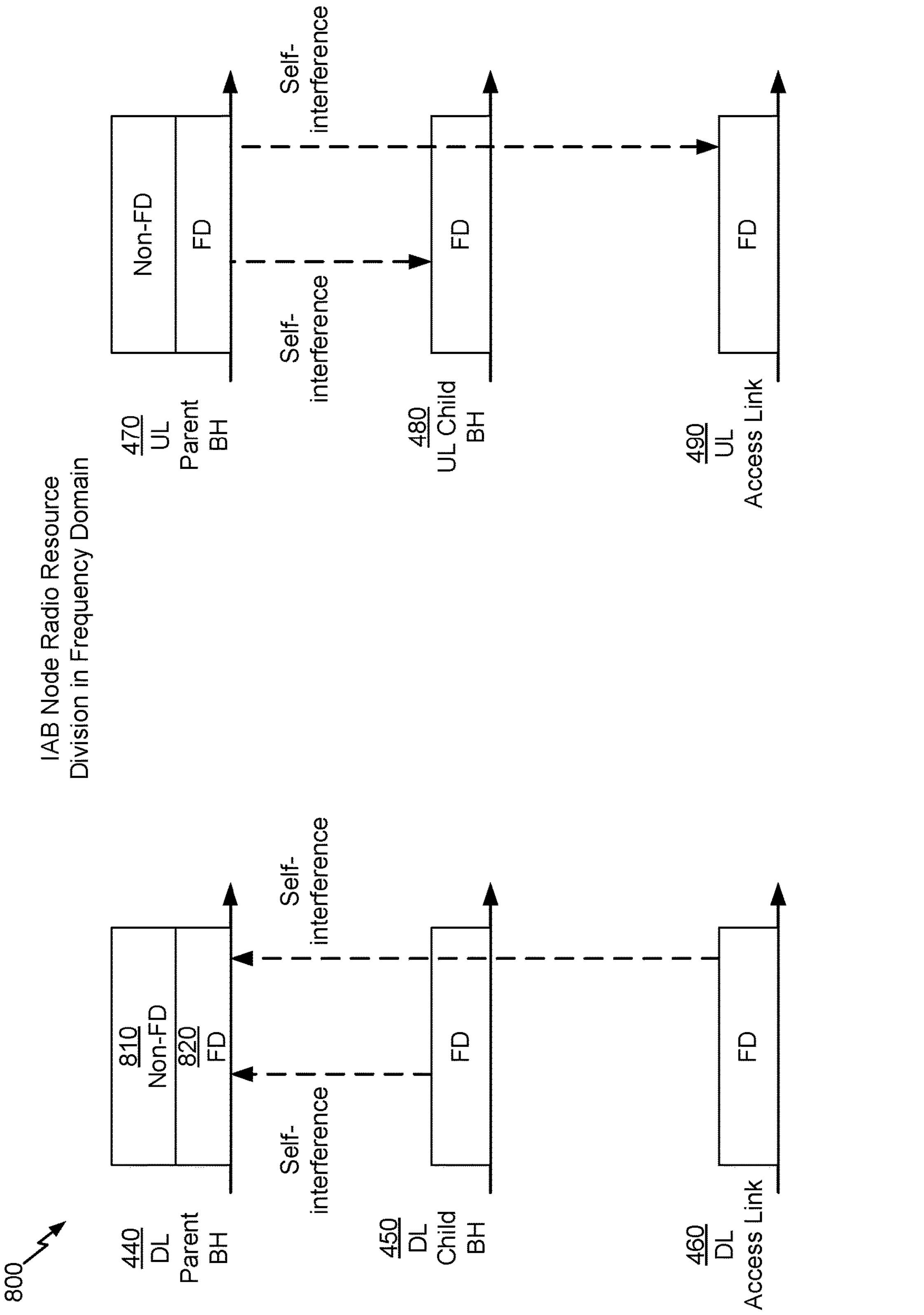
FIG. 8 is a diagram illustrating an example of an IAB node radio resource division in the frequency domain.

FIG. 8 is a diagram illustrating an example 800 of an IAB node radio resource division in the frequency domain. Resources on a variety of BH and access links are shown by reference numbers 440 through 490 (referring back to FIG. 4). For example, example 800 shows that the DL parent BH link 440 may carry at least one of a non-FD communication 810 and an FD communication 820, which are separated in frequency and concurrent in time. The self-interference of the FD mode communications and the non-FD mode communications, and the differences in interference, transmit power, and MCS between the FD communications and the non-FD communications, are described in more detail in connection with FIG. 7.

As indicated above, FIG. 8 is provided as an example. Other examples may differ from what is described with regard to FIG. 8.

Figure 9:
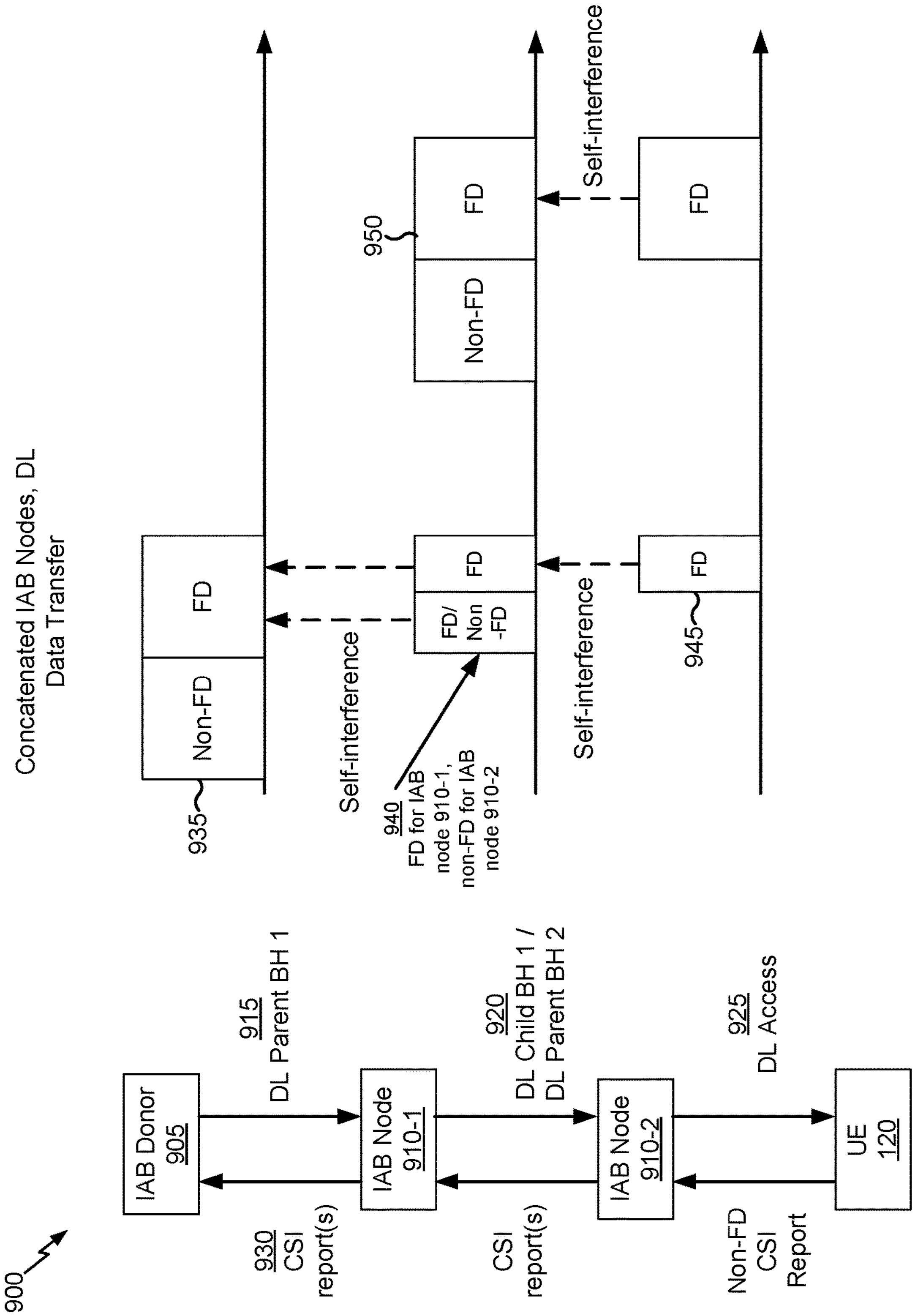
FIG. 9 is a diagram illustrating an example of downlink FD data transfer for concatenated IAB nodes.

FIG. 9 is a diagram illustrating an example 900 of downlink FD data transfer for concatenated JAB nodes. As shown, FIG. 9 includes an JAB donor 905 (e.g., parent node 410, BS 110, anchor base station 335, and/or the like), JAB nodes 910-1 and 910-2 (e.g., parent node 410, TAB node 420, child node 430, and/or the like), and a UE 120. As shown by reference number 915, a DL parent BH link is provided from TAB donor 905 to TAB node 910-1 (denoted as DL parent BH 1 to distinguish from the DL Parent BH link from JAB node 910-1 to JAB node 910-2). As shown by reference number 920, a DL child BH link is provided from TAB node 910-1 to JAB node 910-2. This link is also shown as a DL parent BH link, since JAB node 910-1 is a parent node to TAB node 910-2, which is a parent node to UE 120 (e.g., via DL access link 925).

As shown by reference number 930, TAB node 910-1 may report CSI for the FD mode and for the non-FD mode to JAB donor 905. Similarly, TAB node 910-2 may report CSI for the FD mode and for the non-FD mode to JAB node 910-1, and UE 120 may report CSI for the non-FD mode (since UE 120 does not perform FD communication) to the TAB node 910-2. Accordingly, JAB donor 905 may handle scheduling and MCS determination on DL parent BH link 915, TAB node 910-1 may handle scheduling and MCS determination on DL child BH link 920, and TAB node 910-2 may handle scheduling and MCS determination on DL access link 925.

The timeline shown by reference number 935 illustrates communications on the DL parent BH 1 link 915, the timeline shown by reference number 940 illustrates communications on the DL parent BH 2 link 920, and the timeline shown by reference number 945 illustrates communications on the DL access link 925. Reference number 950 indicates another example of a communication between IAB nodes 910-1 and 910-2 and UE 120.

As shown, self-interference may occur at IAB node 910-1 from the FD communication to IAB node 910-2 on the DL child BH 1 link 920. Furthermore, self-interference may occur at IAB node 910-2 on the FD communication with the IAB node 910-1 due to the FD communication to the UE 120 on the DL access link 925, which may be concurrent with the FD communication with the IAB node 910-1. The interference mitigation and FD communication scheduling techniques described herein may mitigate interference in multi-hop scenarios by providing different MCSs for non-FD and FD communications, scheduling a combination of non-FD and FD communications, and/or the like.

Figure 10:
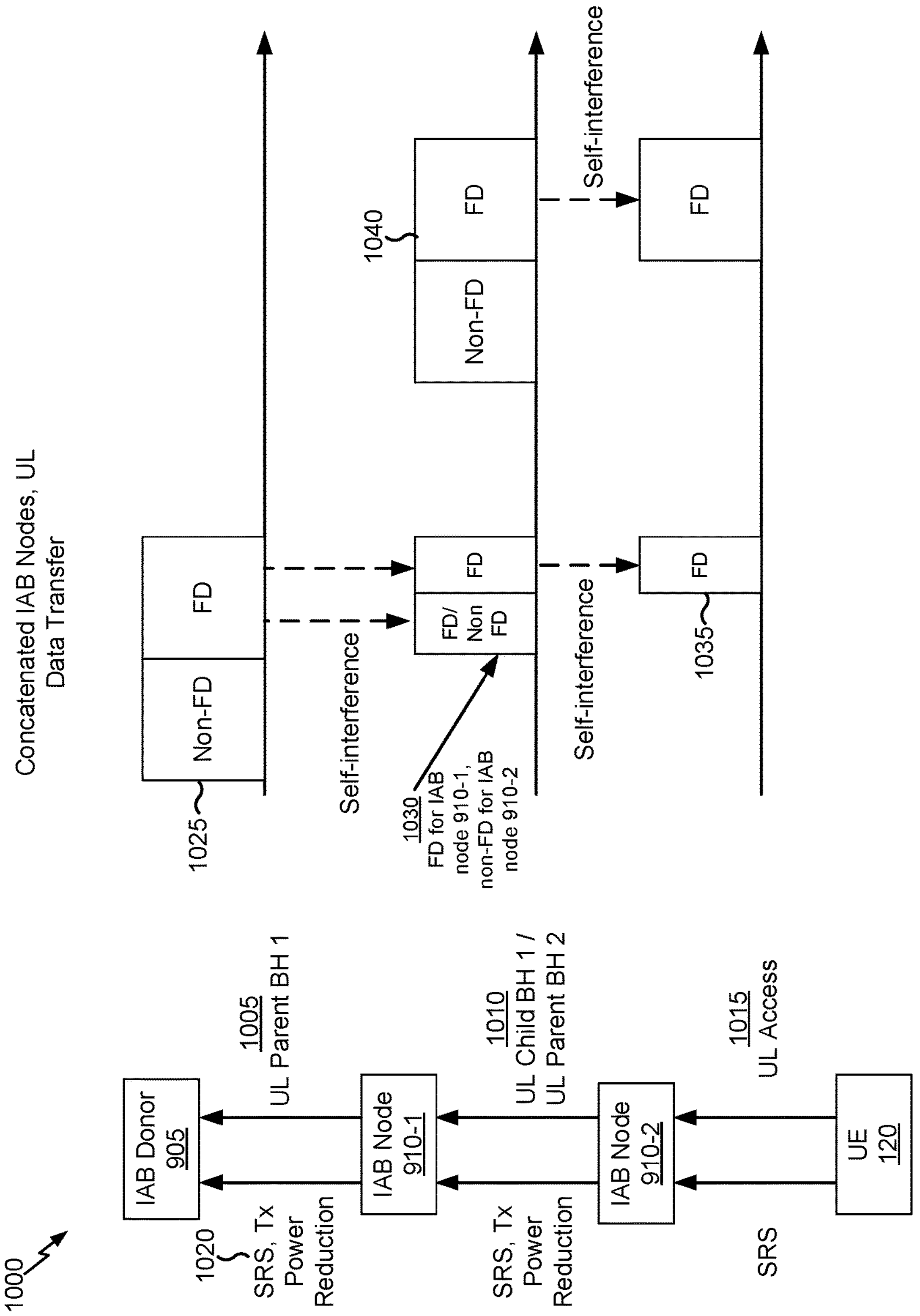
FIG. 10 is a call flow diagram illustrating an example of uplink FD data transfer for concatenated IAB nodes.

FIG. 10 is a call flow diagram illustrating an example 1000 of uplink FD data transfer for concatenated IAB nodes. Reference numbers for IAB donor 905 and IAB nodes 910-1 and 910-2 are reproduced from FIG. 9. As shown, a UL parent BH 1 link 1005 is provided between IAB donor 905 and IAB node 910-1, a UL child BH 1 link 1010 (also shown as a UL parent BH 2 link) is provided between IAB node 910-1 and IAB node 910-2, and a UL access link 1015 is provided between IAB node 910-2 and UE 120.

As shown by reference number 1020, TAB node 910-1 may transmit an SRS and/or information indicating a transmit power value (e.g., a transmit power reduction value) to IAB donor 905. Similarly, IAB node 910-2 may transmit the SRS and the transmit power value to IAB node 910-1, and UE 120 may transmit only an SRS (since UE 120 does not perform FD communication) to the IAB node 910-2. Accordingly, IAB donor 905 may handle scheduling and MCS determination on UL parent BH 1 link 1005, IAB node 910-1 may handle scheduling and MCS determination on UL child BH 1 link 1010, and IAB node 910-2 may handle scheduling and MCS determination on UL access link 1015.

The timeline shown by reference number 1025 illustrates communications on the UL parent BH 1 link 1005, the timeline shown by reference number 1030 illustrates communications on the UL parent BH 2 link 1010, and the timeline shown by reference number 1035 illustrates communications on the UL access link 1015. Reference number 1040 indicates another example of a communication between IAB nodes 910-1 and 910-2 and UE 120.

As shown, self-interference may occur at IAB node 910-1 due to the FD communication on the UL child BH 1 link 1010. The self-interference may occur on the UL child BH 1 link 1010 for an FD communication. Furthermore, self-interference may occur at IAB node 910-2 due to the FD communication with the IAB node 910-1. The self-interference may occur on the UL access link 1015, which may be concurrent with the FD communication with the IAB node 910-1. The interference mitigation and FD communication scheduling techniques described herein may mitigate interference in multi-hop scenarios by providing different MCSs for non-FD and FD communications, scheduling a combination of non-FD and FD communications, and/or the like.

As indicated above, FIGS. 9 and 10 are provided as examples. Other examples may differ from what is described with regard to FIGS. 9 and 10.

Figure 11:
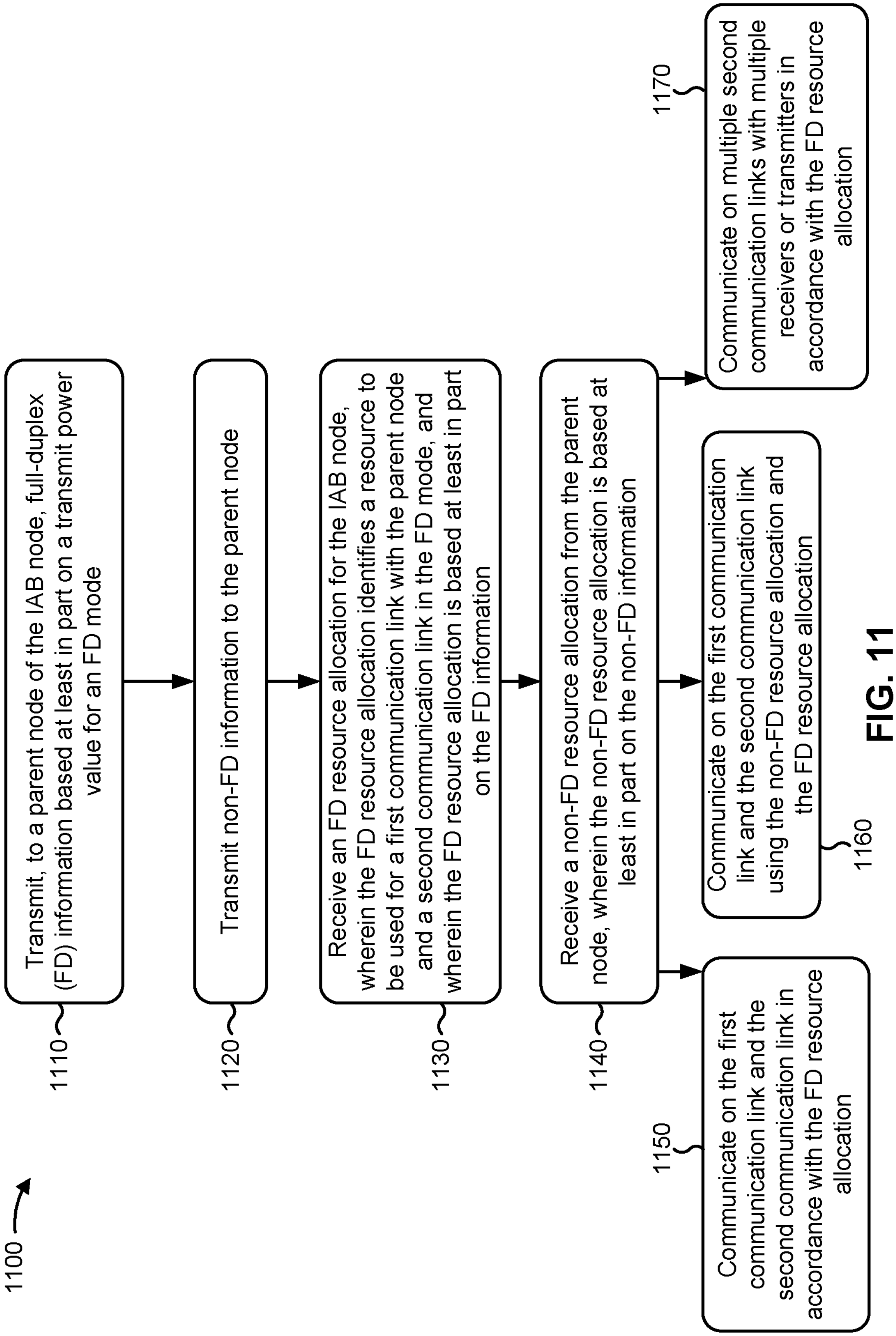
FIG. 11 is a diagram illustrating an example process performed, for example, by an IAB node, in accordance with various aspects of the present disclosure.

FIG. 11 is a diagram illustrating an example process 1100 performed, for example, by an IAB node, in accordance with various aspects of the present disclosure. Example process 1100 is an example where an IAB node (e.g., BS 110, UE 120, parent node 410, IAB node 420, child node 430, IAB node 910, and/or the like) performs operations associated with data transfer for an IAB system using full-duplex.

As shown in FIG. 11, in some aspects, process 1100 may include transmitting, to a parent node of the JAB node, full-duplex (FD) information based at least in part on a transmit power value for an FD mode (block 1110). For example, the JAB node (e.g., using controller/processor 240, transmit processor 220, TX MIMO processor 230, MOD 232, antenna 234, and/or the like) may transmit, to a parent node of the JAB node, full-duplex (FD) information based at least in part on a transmit power value for an FD mode, as described above.

As shown in FIG. 11, in some aspects, process 1100 may include transmitting non-FD information to the parent node (block 1120). For example, the JAB node (e.g., using controller/processor 240, transmit processor 220, TX MIMO processor 230, MOD 232, antenna 234, and/or the like) may transmit, to a parent node of the JAB node, non-FD information.

As further shown in FIG. 11, in some aspects, process 1100 may include receiving an FD resource allocation for the JAB node, wherein the FD resource allocation identifies a resource to be used for a first communication link with the parent node and a second communication link in the FD mode, and wherein the FD resource allocation is based at least in part on the FD information (block 1130). For example, the JAB node (e.g., using antenna 234, DEMOD 232, MIMO detector 236, receive processor 238, controller/processor 240, and/or the like) may receive an FD resource allocation for the JAB node, as described above. In some aspects, the FD resource allocation identifies a resource to be used for a first communication link with the parent node and a second communication link in the FD mode. In some aspects, the FD resource allocation is based at least in part on the FD information.

As shown in FIG. 11, in some aspects, process 1100 may include receiving a non-FD resource allocation from the parent node, wherein the non-FD resource allocation is based at least in part on the non-FD information (block 1140). For example, the IAB node (e.g., using controller/processor 240, transmit processor 220, TX MIMO processor 230, MOD 232, antenna 234, and/or the like) may receive a non-FD resource allocation from the parent node. The non-FD resource allocation may be based at least in part on the non-FD information.

As further shown in FIG. 11, in some aspects, process 1100 may include communicating on the first communication link and the second communication link in accordance with the FD resource allocation (block 1150). For example, the IAB node (e.g., using controller/processor 240, transmit processor 220, TX MIMO processor 230, MOD 232, antenna 234, and/or the like) may communicate on the first communication link and the second communication link in accordance with the FD resource allocation, as described above.

As further shown in FIG. 11, in some aspects, process 1100 may include communicating on the first communication link and the second communication link using the non-FD resource allocation and the FD resource allocation (block 1160). For example, the IAB node (e.g., using controller/processor 240, transmit processor 220, TX MIMO processor 230, MOD 232, antenna 234, and/or the like) may communicate on the first communication link and the second communication link using the non-FD resource allocation and the FD resource allocation.

As further shown in FIG. 11, in some aspects, process 1100 may include communicating on multiple second communication links with multiple receivers or transmitters in accordance with the FD resource allocation (block 1170). For example, the IAB node (e.g., using controller/processor 240, transmit processor 220, TX MIMO processor 230, MOD 232, antenna 234, and/or the like) may communicate on multiple second communication links with multiple receivers or transmitters in accordance with the FD resource allocation.

Process 1100 may include additional aspects, such as any single aspect or any combination of aspects described below and/or in connection with one or more other processes described elsewhere herein.

In a first aspect, the transmit power value is a transmit power restriction value and the FD information indicates channel state information for the first communication link.

In a second aspect, alone or in combination with the first aspect, the first communication link is a downlink backhaul link to the IAB node and the second communication link is at least one of a downlink backhaul link to a child node of the IAB node or a downlink access link.

In a third aspect, alone or in combination with one or more of the first and second aspects, the transmit power value is a transmit power reduction value. In some aspects, the FD information includes at least one of a reference signal or the transmit power reduction value.

In a fourth aspect, alone or in combination with one or more of the first through third aspects, the first communication link is an uplink backhaul link to the parent node and the second communication link is at least one of an uplink backhaul link from a child node of the IAB node or an uplink access link.

In a fifth aspect, alone or in combination with one or more of the first through fourth aspects, the non-FD information includes channel state information for a non-FD mode on the first communication link.

In a sixth aspect, alone or in combination with one or more of the first through fifth aspects, the FD resource allocation and the non-FD resource allocation include respective values indicating that the FD resource allocation is associated with the FD mode and that the non-FD resource allocation is associated with a non-FD mode.

In a seventh aspect, alone or in combination with one or more of the first through sixth aspects, the FD resource allocation and the non-FD resource allocation comprise at least one of: respective time resources, respective frequency resources, or respective time-frequency resources.

In an eighth aspect, alone or in combination with one or more of the first through seventh aspects, the non-FD resource allocation is associated with a different modulation and coding scheme than the FD resource allocation.

In a ninth aspect, alone or in combination with one or more of the first through eighth aspects, the FD resource allocation includes a modulation and coding scheme for the FD mode.

In a tenth aspect, alone or in combination with one or more of the first through ninth aspects, the transmit power value is based at least in part on a transmit power of the second communication link or a self-interference strength between the second communication link and the first communication link.

In an eleventh aspect, alone or in combination with one or more of the first through tenth aspects, the transmit power value is based at least in part on an allowable self-interference strength at a receiver on the second communication link or a self-interference cancellation value at the receiver.

In a twelfth aspect, alone or in combination with one or more of the first through eleventh aspects, the FD information is provided using a media access control (MAC) control element (CE).

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
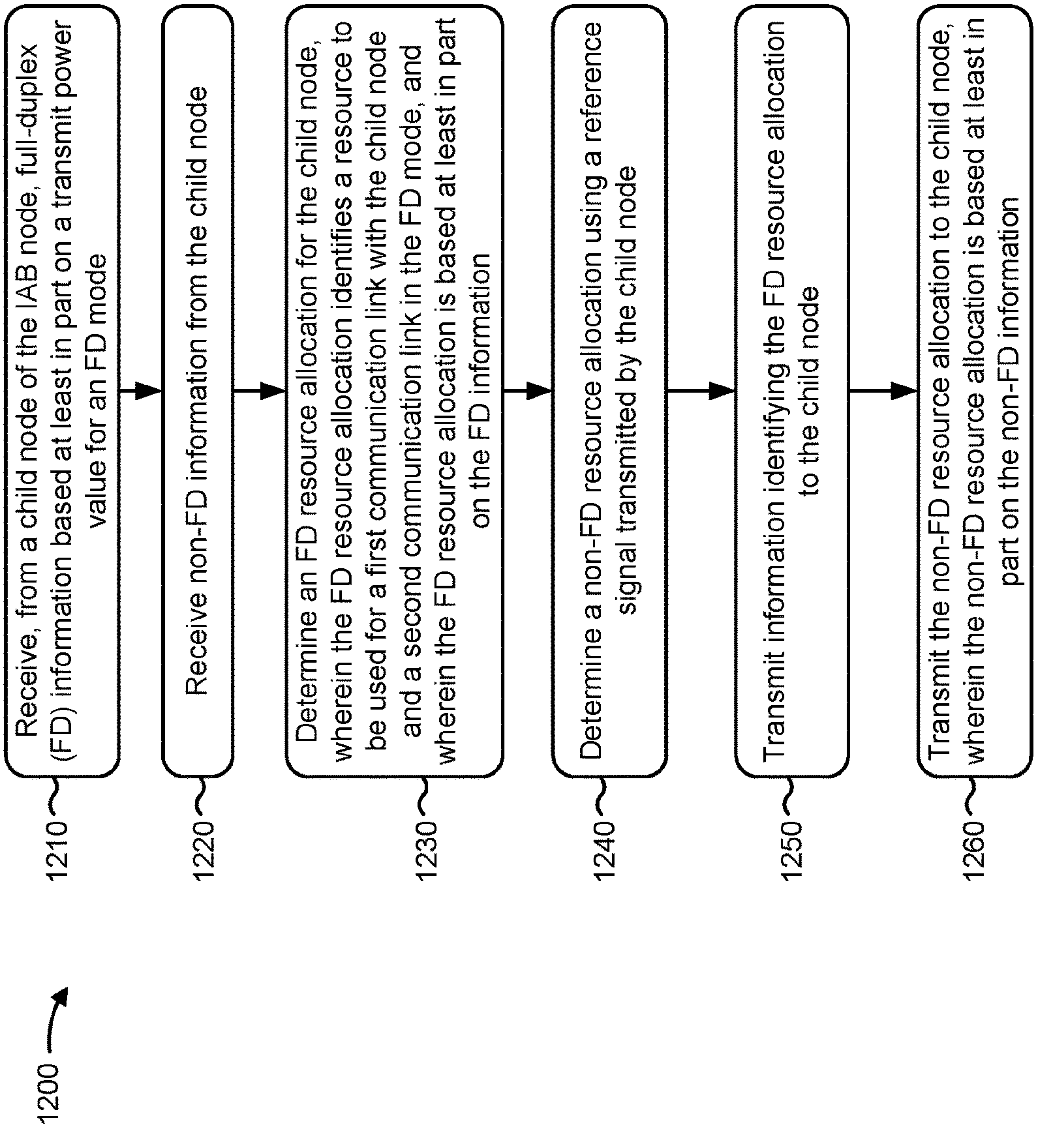
FIG. 12 is a diagram illustrating an example process performed, for example, by an IAB node, in accordance with various aspects of the present disclosure.

FIG. 12 is a diagram illustrating an example process 1200 performed, for example, by an JAB node, in accordance with various aspects of the present disclosure. Example process 1200 is an example where an JAB node (e.g., BS 110, UE 120, parent node 410, JAB node 420, child node 430, donor node 905, JAB node 910, and/or the like) performs operations associated with data transfer for an JAB system using full-duplex.

As shown in FIG. 12, in some aspects, process 1200 may include receiving, from a child node of the JAB node, FD information based at least in part on a transmit power value for an FD mode (block 1210). For example, the JAB node (e.g., using antenna 234, DEMOD 232, MIMO detector 236, receive processor 238, controller/processor 240, and/or the like) may receive, from a child node of the JAB node, FD information based at least in part on a transmit power value for an FD mode, as described above. The FD information may include, for example, a CSI report, an SRS, information identifying a transmit power value (e.g., a transmit power restriction or a transmit power reduction value), and/or the like.

As further shown in FIG. 12, in some aspects, process 1200 may include receiving non-FD information from the child node (block 1220). For example, the JAB node (e.g., using antenna 234, DEMOD 232, MIMO detector 236, receive processor 238, controller/processor 240, and/or the like) may receive non-FD information from the child node, as described above. The non-FD information may include, for example, a CSI report, an SRS, and/or the like.

As further shown in FIG. 12, in some aspects, process 1200 may include determining an FD resource allocation for the child node, wherein the FD resource allocation identifies a resource to be used for a first communication link with the child node and a second communication link in the FD mode, and wherein the FD resource allocation is based at least in part on the FD information (block 1230). For example, the JAB node (e.g., using controller/processor 240 and/or the like) may determine an FD resource allocation for the child node, as described above. In some aspects, the FD resource allocation identifies a resource to be used for a first communication link with the child node and a second communication link in the FD mode. In some aspects, the FD resource allocation is based at least in part on the FD information.

As further shown in FIG. 12, in some aspects, process 1200 may include determining a non-FD resource allocation using a reference signal transmitted by the child node (block 1240). For example, the JAB node (e.g., using controller/processor 240 and/or the like) may determine the non-FD resource allocation using a reference signal transmitted by the child node, as described above. In some aspects, the JAB node (e.g., using controller/processor 240 and/or the like) may determine the FD resource allocation using the reference signal and the transmit power reduction value.

As further shown in FIG. 12, in some aspects, process 1200 may include transmitting information identifying the FD resource allocation to the child node (block 1250). For example, the JAB node (e.g., using controller/processor 240, transmit processor 220, TX MIMO processor 230, MOD 232, antenna 234, and/or the like) may transmit information identifying the FD resource allocation to the child node, as described above.

As further shown in FIG. 12, in some aspects, process 1200 may include transmitting the non-FD resource allocation to the child node, wherein the non-FD resource allocation is based at least in part on the non-FD information (block 1260). For example, the JAB node (e.g., using controller/processor 240, transmit processor 220, TX MIMO processor 230, MOD 232, antenna 234, and/or the like) may transmit the non-FD resource allocation to the child node, wherein the non-FD resource allocation is based at least in part on the non-FD information, as described above. In some aspects, the IAB node may communicate with the child node and/or another node using the FD resource allocation and/or the non-FD resource allocation.

Process 1200 may include additional aspects, such as any single aspect or any combination of aspects described below and/or in connection with one or more other processes described elsewhere herein.

In a first aspect, the transmit power value is a transmit power restriction value and the FD information indicates channel state information for the first communication link.

In a second aspect, alone or in combination with the first aspect, the first communication link is a downlink backhaul link to the child node of the IAB node, and the second communication link is at least one of a downlink backhaul link to a grandchild node of the IAB node or a downlink access link of the child node of the IAB node.

In a third aspect, alone or in combination with one or more of the first and second aspects, the transmit power value is a transmit power reduction value, wherein the FD information includes at least one of a reference signal or the transmit power reduction value.

In a fourth aspect, alone or in combination with one or more of the first through third aspects, the first communication link is an uplink backhaul link to the child node of the IAB node, and the second communication link is at least one of an uplink backhaul link from a grandchild node of the IAB node to the child node of the IAB node or an uplink access link of the child node of the IAB node.

In a fifth aspect, alone or in combination with one or more of the first through fourth aspects, the non-FD information includes channel state information for a non-FD mode on the first communication link.

In a sixth aspect, alone or in combination with one or more of the first through fifth aspects, the FD resource allocation and the non-FD resource allocation include respective values indicating that the FD resource allocation is associated with the FD mode and that the non-FD resource allocation is associated with a non-FD mode.

In a seventh aspect, alone or in combination with one or more of the first through sixth aspects, the FD resource allocation and the non-FD resource allocation comprise at least one of: respective time resources, respective frequency resources, or respective time-frequency resources.

In an eighth aspect, alone or in combination with one or more of the first through seventh aspects, the non-FD resource allocation is associated with a different modulation and coding scheme than the FD resource allocation.

In a ninth aspect, alone or in combination with one or more of the first through eighth aspects, the FD resource allocation includes a modulation and coding scheme for the FD mode.

In a tenth aspect, alone or in combination with one or more of the first through ninth aspects, the transmit power value is based at least in part on a transmit power of the second communication link or a self-interference strength between the second communication link and the first communication link.

In an eleventh aspect, alone or in combination with one or more of the first through tenth aspects, the transmit power value is based at least in part on an allowable self-interference strength at a receiver on the second communication link or a self-interference cancellation value at the receiver.

In a twelfth aspect, alone or in combination with one or more of the first through eleventh aspects, the FD information is provided using a media access control (MAC) control element (CE).

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

Further disclosure is included in the appendix. The appendix is provided as an example only, and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

Data Transfer for IAB System with Full Duplex

Problem

- In legacy IAB system without full duplex, for an IAB node, its transmission and reception cannot be performed concurrently.
  - Among its six kinds of links, DL Parent BH, UL Child BH and UL Access are reception links, while UL Parent BH, DL Child BH and DL Access are transmission links. Any reception link and any transmission link cannot have data transfer concurrently.
  - When the traffics of transmission and reception are static, the pattern for non-concurrent transmission and reception time slots can be given according to the proportion of transmission traffic and reception traffic.
- However, when the traffics of transmission and reception are dynamic, or some urgent traffic occurs in an inverse-direction time slot, such non-concurrent transmission-reception pattern cannot satisfy the requirements.
- Therefore, consider using full duplex technology to enable concurrent transmission and reception at IAB node, so that the dynamic traffic allocation, improved system capacity and capability to fast deliver any-directional packet is supported.
  - Decide the optimal transport format and transmit power in IAB node chain where full duplex is activated at each IAB node, because the DL/UL metrics along the chain are closely coupled.
  - Provide an efficient scheme that relies on the Parent node to determine the MCSs for Parent BH links based on IAB node's feedback information on its full duplex operation.

Solution

Brief Description

- In legacy IAB system with full duplex, for an IAB node, its transmission and reception can be performed concurrently. In some cases, the transmitted signal would cause self-interference to the received signal. To reduce or eliminate such interference, the transmitted signal may use a reduced transmit power.
- Due to above facts, we propose the data transfer scheme for the links of an IAB node.
  - DL data transfer:
    - IAB node determines a transmit power restriction value for FD mode, based on which IAB node determines CSI of DL Parent BH link for FD mode.
    - IAB node reports CSI of DL Parent BH link to Parent node for non-FD mode and FD mode respectively, and then Parent node determines the MCS values and radio resource allocations at DL Parent BH link for non-FD mode and FD mode respectively.
    - IAB node can use the radio resource for FD mode to schedule DL Child BH link and DL Access link based on the determined transmit power restriction value.
  - UL data transfer:
    - IAB node determines a transmit power reduction value for FD mode.
    - IAB node sends SRS and the transmit power reduction value for FD mode to Parent node, and then Parent node determines the MCS values and radio resource allocations at UL Parent BH link for non-FD mode and FD mode respectively.
    - IAB node can use the radio resource for FD mode to schedule UL Child BH link and UL Access link, based on the self-interference caused by the determined transmit power reduction value.

Solution

DL data transfer

- Procedure
  - Parent node sends reference signal (e.g. CSI-RS) and CSI report configuration to IAB node;
  - IAB node determines a transmit power restriction value at IAB node (e.g. the transmit power at FD mode is not larger than P_tx_max);
  - IAB node determines the CSI at non-FD mode and the CSI at FD mode, where the CSI at FD mode is based on the transmit power restriction value at IAB node ;
  - IAB node sends CSI report to Parent node, containing the CSI at non-FD mode and the CSI at FD mode;
  - Parent node determines the MCS and radio resource allocation at non-FD mode and MCS and radio resource allocation at FD mode of DL Parent BH;
  - Parent sends these MCS values and radio resources allocations to IAB node, as well as the indication of FD mode or non-FD mode;
  - IAB node receives the data in DL Parent BH, and it can also schedule DL Child BH or DL Access at the radio resource for FD mode, with the above transmit power restriction value at FD mode.

The red messages: CSI report for non-FD mode and FD mode, DL grant containing flags to indicate FD/non-FD mode are standard impacts.

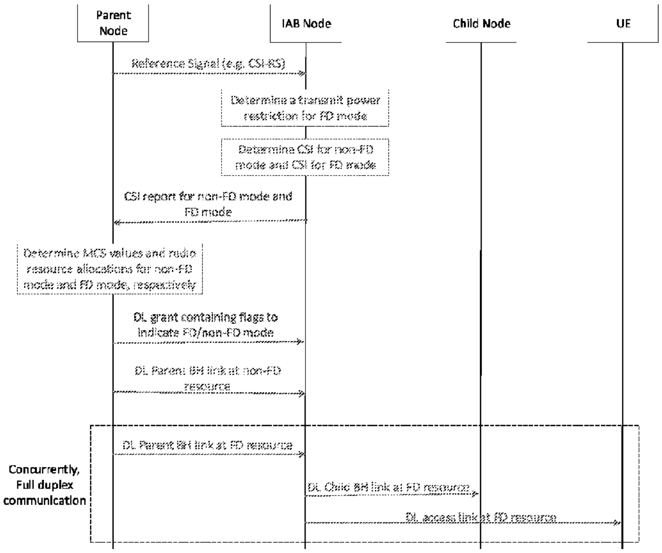

Solution

UL data transfer

- Procedure
  - IAB node sends reference signal (e.g. SRS);
  - IAB node determines transmit power reduction value (e.g. the transmit power at FD mode is reduced to an absolute value or a relative value relative to the transmit power at non-FD mode ).
  - IAB node indicates the transmit power reduction value to Parent node;
  - Parent node determines the MCS valuse and radio resource allocations of UL Parent BH at non-FD mode and at FD mode, respectively;
  - Parent node sends these MCS values and radio resources allocations to IAB node, as well as the indication of FD mode or non-FD mode;
  - IAB node transmit the data in UL Parent BH, with the above transmit power reduction value at FD mode. At the same time, it can also schedule UL Child BH or UL Access at the radio resource for FD mode.

The red messages: indicate transmit power reduction value at FD mode, UL grant containing flags to indicate FD/non-FD mode are standard impacts.

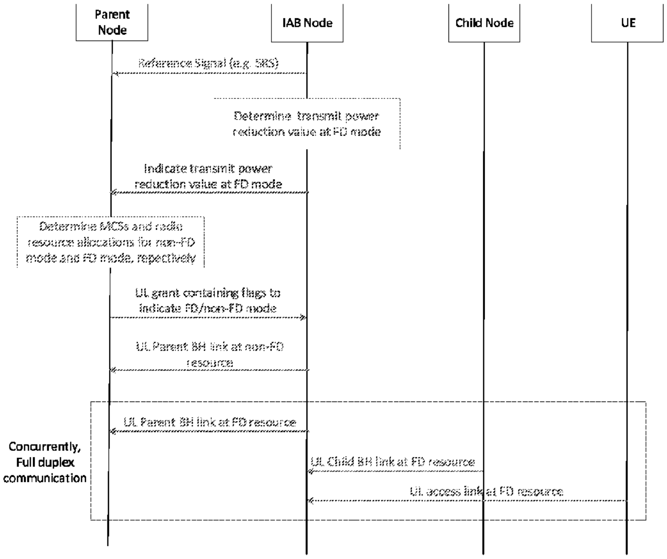

Solutions

Details (1)

- (DL data transfer) The process of determining transmit power restriction value and CSI at FD mode by IAB node comprises:
  - Determine the transmit power in the DL_Child_BH/DL_Access link. In some case, it is a static or fixed value; in other cases, it is based on the pathloss in DL_Child_BH/DL_Access link.
  - Determine the self-interference strength from the transmitted signal in DL_Child_BH link/DL_Access to DL_Parent_BH link, based on the transmit power in the DL_Child_BH/DL_Access link and self-interference cancellation ratio. Spscifically, the self-interference strength is equal to the transmit power in the DL_Child_BH/DL_Access link subtracting the self-interference cancellation ratio.
  - Determine the CSI at FD mode based on the self-interference strength and channel status estimation based on CSI-RS in DL_Parent_BH link. Specifically, if the self-interference strength is larger than interference-plus-noise power at non-FD mode, the CSI derived from CSI-RS at non-FD mode would be degraded by the self-interference at FD mode.
- (UL data transfer) The process of determining transmit power restriction value at FD mode by IAB node comprises:
  - Determine the allowable self-interference strength at the receiver of UL_Child_BH link/UL_Access link. In some case, it is a static or fixed value; in other cases, it is based on the receive signal strength and target SINR in UL_Child_BH/UL_Access link.
  - Determine transmit power restriction value at FD mode based on the allowable self-interference strength and the self-interference cancellation ratio. Specifically, the transmit power restriction value at FD mode is equal to the allowable self-interference strength in the UL_Child_BH/UL_Access link adding the self-interference cancellation ratio.

Solutions

Details (2)

- (UL data transfer) The process of determining the MCS and radio resource allocation at FD mode by Parent node comprises:
  - Determine the channel status estimation based on SRS in UL_Parent_BH link.
  - Determine the MCS and radio resource allocation at non-FD mode based on the channel status estimation.
  - Determine the MCS and radio resource allocation at FD mode based on the channel status estimation and the received transmit power reduction value. Specifically, the actual transmit power at FD mode is equal to the transmit power at non-FD mode subtracting the transmit power reduction value. The lower transmit power would cause degraded MCS at UL_Parent_BH link.
- The radio resource division between FD mode and non-FD mode can be in time domain, frequency domain, or mixed time-frequency domain.
- The message to indicate transmit power reduction value can be via MAC CE.
- The transfer in DL_Child_BH and UL_Child_BH can be further decomposed into non-FD mode and FD mode, executed by IAB node and its Child Node.

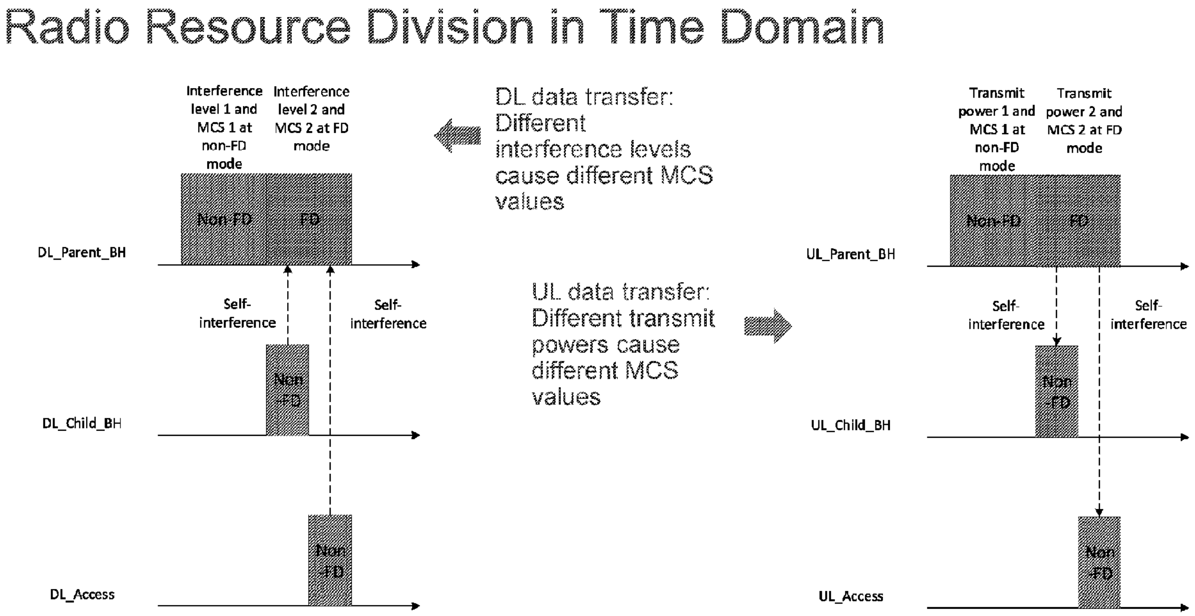
Radio Resource Division in Time Domain
Interference level 1 and MCS 1 at non-FD mode
Interference level 2 and MCS 2 at FD mode
DL data transfer: Different interference levels cause different MCS values
Non-FD
FD
DL_Parent_BH
Self-interference
Self-interference
Non-FD
DL_Child_BH
Non-FD
DL_Access
Transmit power 1 and MCS 1 at non-FD mode
Transmit power 2 and MCS 2 at FD mode
UL data transfer: Different transmit powers cause different MCS values
Non-FD
FD
UL_Parent_BH
Self-interference
Self-interference
Non-FD
UL_Child_BH
Non-FD
UL_Access

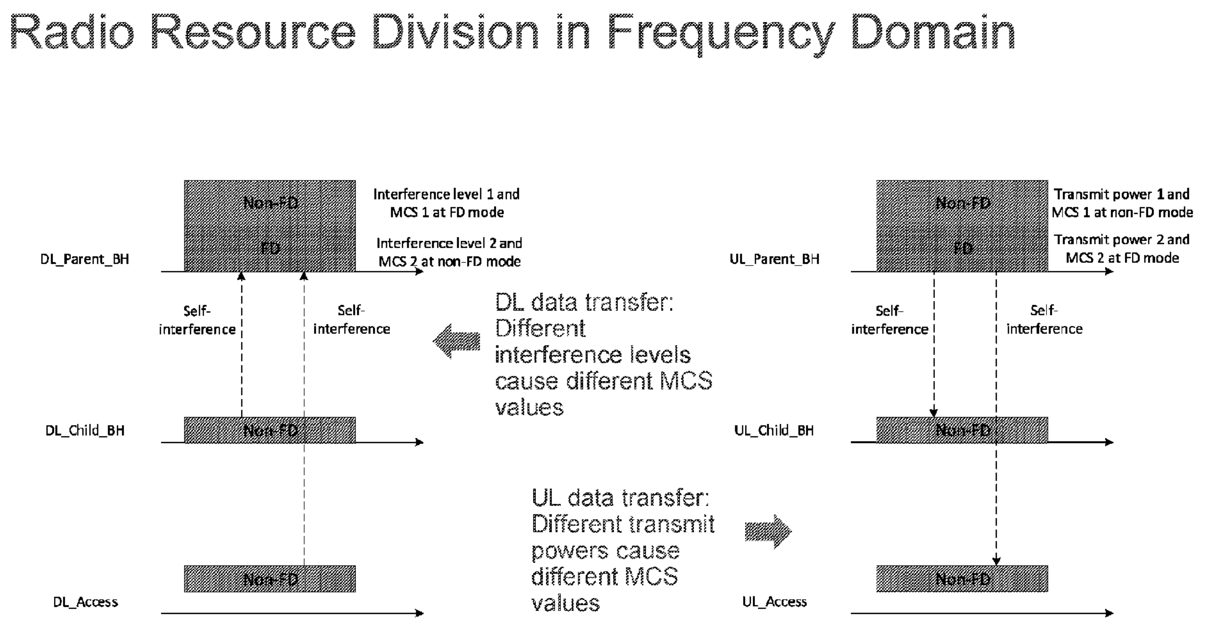
Radio Resource Division in Frequency Domain
Non-FD
FD
Interference level 1 and MCS 1 at FD mode
Interference level 2 and MCS 2 at non-FD mode
DL_Parent_BH
Self-interference
Self-interference
DL data transfer: Different interference levels cause different MCS values
DL_Child_BH
Non-FD
DL_Access
Non-FD
UL data transfer: Different transmit powers cause different MCS values
Non-FD
FD
Transmit power 1 and MCS 1 at non-FD mode
Transmit power 2 and MCS 2 at FD mode
UL_Parent_BH
Self-interference
Self-interference
UL_Child_BH
Non-FD
UL_Access
Non-FD

Solutions

Concatenated IAB nodes, DL Data Transfer

- The DL_Child_BH 1 for IAB node 1 is the DL_Parent_BH 2 for IAB node 2.
  - Operated by IAB node 1 and IAB node 2, the radio resource for data transfer in DL_Child_BH 1 can be further decomposed as non-FD part and FD part. The FD part is concurrent with the data transfer in DL_Access 2.
  - IAB node 1 reports FD/non-FD CSI to IAB donor, based on which IAB donor determines the scheduling of DL_Parent_BH 1.
  - IAB node 2 reports FD/non-FD CSI to IAB node 1, based on which IAB node 1 determines the scheduling of DL_Parent_BH 2.
  - UE reports non-FD CSI to IAB node 2, based on which IAB node 2 determines the scheduling of DL_Access 2.
- This figure also shows some other radio esource whose utilization starts from )L_Child_BH 1 and ends at DL_Access 2.

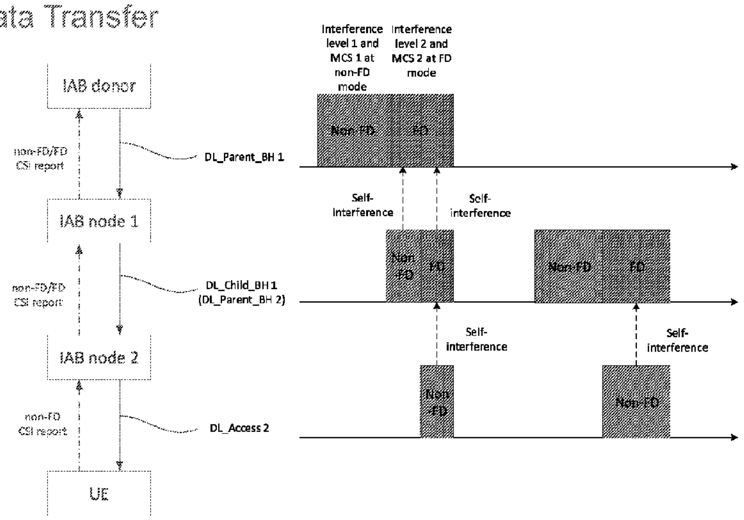

Solutions

Concatenated IAB nodes, UL Data Transfer

- The UL_Child_BH 1 for IAB node 1 is the UL_Parent_BH 2 for IAB node 2.
  - Operated by IAB node 1 and IAB node 2, the radio resource for data transfer in UL_Child_BH 1 can be further decomposed as non-FD part and FD part. The FD part is concurrently with the data transfer in UL_Access 2.
  - IAB node 1 sends SRS 1 and indicates transmit power reduction value 1 to IAB donor, based on which IAB donor determines the scheduling of UL_Parent_BH 1.
  - IAB node 2 sends SRS 2 and indicates transmit power reduction value 2 to IAB node 1, based on which IAB node 1 determines the scheduling of UL_Parent_BH 2.
  - IAB node 2 sends SRS 3 to IAB node 2, based on which IAB node 2 determines the scheduling of UL_Access 2.

This figure also shows some other radio esource whose utilization starts from JL_Child_BH 1 and ends at UL_Access 2.

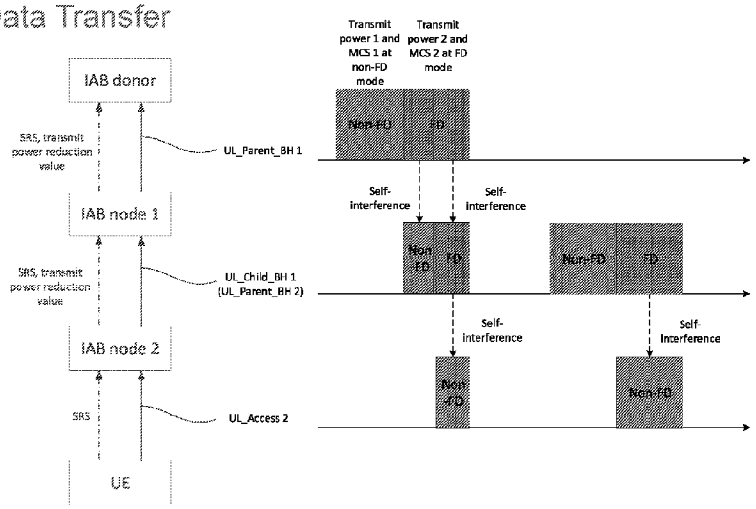

What is claimed is:

1. A method of wireless communication performed by an integrated access and backhaul (IAB) node, comprising:

transmitting, to a parent node of the IAB node via a medium access control control element (MAC-CE), full-duplex (FD) information that includes:

channel state information (CSI) for a non-FD mode and an FD mode when the IAB node receives a channel state information reference signal (CSI-RS) from the parent node on a downlink backhaul link, wherein the CSI for the FD mode is based at least in part on a transmit power restriction value indicating a maximum transmit power for communication in the FD mode, the transmit power restriction value being based at least in part on a self-interference strength associated with transmission on a child backhaul link, between the IAB node and a child IAB node, or an access link between the IAB node and a user equipment (UE), or an indication of a transmit power reduction value, associated with a reduction of a transmit power in the FD mode relative to the non-FD mode, when the IAB node transmits a sounding reference signal (SRS) to the parent node on an uplink backhaul link;

receiving an FD resource allocation for the IAB node, wherein the FD resource allocation identifies a resource for communication on:

at least one of the downlink backhaul link or the uplink backhaul link, and at least one of the child backhaul link or the access link, and wherein the FD resource allocation is based at least in part on the FD information; and communicating in accordance with the FD resource allocation on the at least one of the downlink backhaul link or the uplink backhaul link and the at least one of the child backhaul link or the access link.

2. The method of claim 1, wherein the FD information indicates the channel state information for the FD mode and the non-FD mode.

3. The method of claim 1, further comprising:

transmitting non-FD information to the parent node; and receiving a non-FD resource allocation from the parent node, wherein the non-FD resource allocation is based at least in part on the non-FD information.

4. The method of claim 3, wherein the FD information includes respective values indicating that the FD resource allocation is associated with the FD mode and that the non-FD resource allocation is associated with the non-FD mode.

5. The method of claim 3, wherein the FD resource allocation and the non-FD resource allocation comprise:

respective time resources, respective frequency resources, and respective time-frequency resources.

6. The method of claim 3, wherein the non-FD resource allocation is associated with a different modulation and coding scheme than the FD resource allocation.

7. The method of claim 1, wherein the FD resource allocation includes a modulation and coding scheme for the FD mode.

8. The method of claim 1, wherein the self-interference strength is an allowable self-interference strength at a receiver of the at least one of the downlink backhaul link or the access link.

9. The method of claim 1, wherein the self-interference strength is an allowable self-interference strength at a receiver of the at least one of the uplink backhaul link or the access link.

10. The method of claim 1, wherein communicating on the at least one of the downlink backhaul link or the uplink backhaul link and the at least one of the child backhaul link or the access link comprises:

communicating on multiple child backhaul links or multiple access links with multiple receivers or transmitters in accordance with the FD resource allocation.

11. The method of claim 1, wherein the FD information includes CSI for the non-FD mode and the FD mode.

12. The method of claim 1, wherein the FD information includes the indication of the transmit power reduction value.

13. The method of claim 12, wherein the transmit power reduction value is based at least in part on an allowable self-interference strength at a receiver of the child backhaul link or the access link.

14. The method of claim 13, wherein the allowable self-interference strength is based at least in part on a received signal strength and a target signal-to-interference-plus-noise ratio (SINR).

15. The method of claim 12, wherein the transmit power reduction value is based at least in part on a self-interference cancellation ratio of the IAB node.

16. A method of wireless communication performed by an integrated access and backhaul (IAB) node, comprising:

receiving, from a child node of the IAB node and via a medium access control control element (MAC-CE), full-duplex (FD) information that includes:

channel state information (CSI) for a non-FD mode and an FD mode when the child node receives a channel state information reference signal (CSI-RS) from the IAB node on a downlink backhaul link, wherein the CSI for the FD mode is based at least in part on a transmit power restriction value indicating a maximum transmit power for communication in the FD mode, the transmit power restriction value being based at least in part on a self-interference strength associated with transmission on a child backhaul link, between the IAB node and a child IAB node, or an access link between the IAB node and a user equipment (UE), or an indication of a transmit power reduction value, associated with a reduction of a transmit power in the FD mode relative to the non-FD mode, when the child node transmits a sounding reference signal to the IAB node on an uplink backhaul link;

determining an FD resource allocation for the child node, wherein the FD resource allocation identifies a resource for communication on:

at least one of the downlink backhaul link or the uplink backhaul link, and at least one of the child backhaul link or the access link; and transmitting, to the child node, information identifying the FD resource allocation.

17. The method of claim 16, wherein the FD information indicates the channel state information for the FD mode and the non-FD mode.

18. The method of claim 16, further comprising:

receiving non-FD information from the child node; and transmitting a non-FD resource allocation to the child node, wherein the non-FD resource allocation is based at least in part on the non-FD information.

19. The method of claim 18, wherein the FD information includes respective values indicating that the FD resource allocation is associated with the FD mode and that the non-FD resource allocation is associated with the non-FD mode.

20. The method of claim 18, wherein the FD resource allocation and the non-FD resource allocation comprise:

respective time resources, respective frequency resources, and respective time-frequency resources.

21. The method of claim 18, wherein the non-FD resource allocation is associated with a different modulation and coding scheme than the FD resource allocation.

22. The method of claim 16, wherein the FD resource allocation includes a modulation and coding scheme for the FD mode.

23. The method of claim 16, wherein the self-interference strength is an allowable self-interference strength at a receiver of the at least one of the downlink backhaul link or the access link.

24. The method of claim 16, wherein the self-interference strength is an allowable self-interference strength at a receiver of the at least one of the uplink backhaul link or the access link.

25. An integrated access and backhaul (IAB) node for wireless communication, comprising:

one or more memories; and one or more processors coupled to the one or more memories, the one or more processors configured to:

transmit, to a parent node of the IAB node via a medium access control control element (MAC-CE), full-duplex (FD) information that includes:

channel state information (CSI) for a non-FD mode and an FD mode when the IAB node receives a channel state information reference signal (CSI-RS) from the parent node on a downlink backhaul link, wherein the CSI for the FD mode is based at least in part on a transmit power restriction value associated with a maximum transmit power for communication in the FD mode, the transmit power restriction value being based at least in part on a self-interference strength from a child backhaul link, between the IAB node and a child IAB node, or an access link between the IAB node and a user equipment (UE), or an indication of a transmit power reduction value, associated with a reduction of a transmit power in the FD mode relative to the non-FD mode, when the IAB node transmits a sounding reference signal (SRS) to the parent node on an uplink backhaul link;

receive an FD resource allocation for the IAB node, wherein the FD resource allocation identifies a resource for communication on:

at least one of the downlink backhaul link or the uplink backhaul link, and at least one of the child backhaul link or the access link; and communicate in accordance with the FD resource allocation on the at least one of the downlink backhaul link or the uplink backhaul link and the at least one of the child backhaul link or the access link.

26. The IAB node of claim 25, wherein the FD information includes CSI for the non-FD mode and the FD mode.

27. The IAB node of claim 25, wherein the FD information includes the indication of the transmit power reduction value.

28. The IAB node of claim 27, wherein the transmit power reduction value is based at least in part on an allowable self-interference strength at a receiver of the child backhaul link or the access link.

29. The IAB node of claim 27, wherein the transmit power reduction value is based at least in part on a self-interference cancellation ratio of the IAB node.

30. An integrated access and backhaul (IAB) node for wireless communication, comprising:

one or more memories; and one or more processors coupled to the one or more memories, the one or more processors configured to:

receive, from a child node of the IAB node and via a medium access control control element (MAC-CE), full-duplex (FD) information that includes:

channel state information (CSI) for a non-FD mode and an FD mode when the child node receives a channel state information reference signal (CSI-RS) from the IAB node on a downlink backhaul link, wherein the CSI at the FD mode is based at least in part on a transmit power restriction value associated with a maximum transmit power for communication in the FD mode, the transmit power restriction value being based at least in part on a self-interference strength from a child backhaul link, between the IAB node and a child IAB node, or an access link between the IAB node and a user equipment (UE), or an indication of a transmit power reduction value, associated with a reduction of a transmit power in the FD mode relative to the non-FD mode, when the child node transmits a sounding reference signal to the IAB node on an uplink backhaul link;

determine an FD resource allocation for the child node, wherein the FD resource allocation identifies a resource for communication on:

at least one of the downlink backhaul link or the uplink backhaul link, and at least one of the child backhaul link or the access link; and transmit, to the child node, information identifying the FD resource allocation.

* * * * *